US010564819B2

(12) United States Patent
Kawano et al.

(10) Patent No.: US 10,564,819 B2
(45) Date of Patent: Feb. 18, 2020

(54) METHOD, APPARATUS AND SYSTEM FOR DISPLAY OF TEXT CORRECTION OR MODIFICATION

(71) Applicant: Sony Corporation, Tokyo (JP)

(72) Inventors: Shinichi Kawano, Tokyo (JP); Tsubasa Tsukahara, Tokyo (JP); Maki Imoto, Tokyo (JP); Ikuo Yamano, Tokyo (JP)

(73) Assignee: Sony Corporation (JP)

( * ) Notice: Subject to any disclaimer, the term of this patent is extended or adjusted under 35 U.S.C. 154(b) by 795 days.

(21) Appl. No.: 14/247,455

(22) Filed: Apr. 8, 2014

(65) Prior Publication Data

US 2014/0317540 A1 Oct. 23, 2014

(30) Foreign Application Priority Data

Apr. 17, 2013 (JP) .................................. 2013-086682

(51) Int. Cl.
*G06F 3/00* (2006.01)
*G06F 3/0484* (2013.01)
*G06F 3/0488* (2013.01)
*G06F 3/048* (2013.01)

(52) U.S. Cl.
CPC .......... *G06F 3/04842* (2013.01); *G06F 3/048* (2013.01); *G06F 3/0484* (2013.01); *G06F 3/0488* (2013.01); *G06F 3/04883* (2013.01); *G06F 3/04886* (2013.01)

(58) Field of Classification Search
CPC ...... G06F 3/048; G06F 3/0484; G06F 3/0488; G06F 3/04883; G06F 3/04886; G06F 3/04842
See application file for complete search history.

(56) References Cited

U.S. PATENT DOCUMENTS

| 5,760,773 A * | 6/1998 | Berman | G06F 1/1626 345/672 |
| 6,587,132 B1 * | 7/2003 | Smethers | G06F 3/04892 345/160 |
| 7,735,023 B1 * | 6/2010 | Chadzelek | G06F 3/0489 715/767 |
| 8,843,844 B2 * | 9/2014 | Laubach | G06F 3/0238 345/168 |
| 9,019,207 B1 * | 4/2015 | Hamburgen | G06F 1/1662 345/156 |
| 2005/0099406 A1 * | 5/2005 | Pettiross | G06F 3/0236 345/179 |

(Continued)

FOREIGN PATENT DOCUMENTS

JP 11-282961 10/1999
JP 2012-053900 A 3/2012

*Primary Examiner* — Kieu D Vu
*Assistant Examiner* — Andrew Chung
(74) *Attorney, Agent, or Firm* — Lerner, David, Littenberg, Krumholz & Mentlik, LLP

(57) ABSTRACT

There is provided an information processing apparatus including a text extraction unit configured to extract text selected through a touch operation of a user from an input text string displayed on a display screen, a text specifying unit configured to specify change text of the selected text, and a selection conclusion unit configured to conclude that the selected text on the display screen is replaced with the change text.

17 Claims, 19 Drawing Sheets

(56) References Cited

U.S. PATENT DOCUMENTS

| | | | |
|---|---|---|---|
| 2007/0294644 A1* | 12/2007 | Yost | G06F 3/04812 715/856 |
| 2010/0235726 A1* | 9/2010 | Ording | G06F 1/1626 715/234 |
| 2011/0113320 A1* | 5/2011 | Neff | G06Q 10/10 715/230 |
| 2011/0202836 A1* | 8/2011 | Badger | G06F 3/0237 715/702 |
| 2012/0054688 A1* | 3/2012 | Ohki | G06F 3/04883 715/838 |
| 2012/0167009 A1* | 6/2012 | Davidson | G06F 17/276 715/816 |
| 2012/0311422 A1* | 12/2012 | Weeldreyer | G06F 3/0488 715/220 |
| 2013/0002575 A1* | 1/2013 | Endo | G06F 3/0236 345/173 |
| 2013/0007606 A1* | 1/2013 | Dolenc | G06F 17/2775 715/256 |
| 2013/0042199 A1* | 2/2013 | Fong | G06F 3/0488 715/780 |
| 2013/0046544 A1* | 2/2013 | Kay | G06F 3/04883 704/275 |
| 2013/0067373 A1* | 3/2013 | Weir | G06F 3/033 715/769 |
| 2013/0222272 A1* | 8/2013 | Martin, Jr. | G06F 3/04886 345/173 |
| 2013/0226935 A1* | 8/2013 | Bai | G06F 17/3064 707/748 |
| 2013/0275924 A1* | 10/2013 | Weinberg | G06F 3/017 715/863 |
| 2013/0290906 A1* | 10/2013 | Thorsander | G06F 3/04842 715/835 |
| 2014/0002338 A1* | 1/2014 | Raffa | G06F 1/1694 345/156 |
| 2014/0040733 A1* | 2/2014 | Colley | G06F 3/0237 715/256 |
| 2014/0040773 A1* | 2/2014 | Sanghavi | G06F 17/273 715/753 |
| 2014/0098023 A1* | 4/2014 | Zhai | G06F 3/0237 345/168 |
| 2014/0104177 A1* | 4/2014 | Ouyang | G06F 3/04883 345/168 |
| 2014/0129929 A1* | 5/2014 | Kim | G06F 17/273 715/257 |
| 2014/0129930 A1* | 5/2014 | Bi | G06F 3/04883 715/261 |
| 2014/0163954 A1* | 6/2014 | Joshi | G06F 17/276 704/9 |
| 2014/0253463 A1* | 9/2014 | Hicks | G06F 3/03545 345/173 |
| 2014/0281943 A1* | 9/2014 | Prilepov | G06F 17/273 715/257 |
| 2014/0282202 A1* | 9/2014 | Tooch | G06F 3/0202 715/773 |
| 2014/0359433 A1* | 12/2014 | Zyl | G06F 3/04883 715/256 |
| 2014/0365485 A1* | 12/2014 | Kim | G06F 3/04883 707/736 |
| 2015/0019227 A1* | 1/2015 | Anandarajah | G10L 15/22 704/257 |
| 2015/0082246 A1* | 3/2015 | Tan | G06F 3/0488 715/823 |
| 2015/0234572 A1* | 8/2015 | Arita | G06F 3/04817 715/846 |
| 2016/0077717 A1* | 3/2016 | Hur | G06F 3/04845 715/769 |
| 2016/0196150 A1* | 7/2016 | Jing | G06F 17/273 715/708 |

* cited by examiner

20a

20b

METHOD, APPARATUS AND SYSTEM FOR DISPLAY OF TEXT CORRECTION OR MODIFICATION

CROSS REFERENCE TO RELATED APPLICATIONS

This application claims the benefit of Japanese Priority Patent Application JP 2013-086682 filed Apr. 17, 2013, the entire contents of which are incorporated herein by reference.

BACKGROUND

The present disclosure relates to an information processing apparatus, an information processing method, and a program.

A variety of information processing terminals including touch panels, such as smartphones, have been developed these days. Generally, a touch panel integrally includes a display device for displaying a display screen and an input device for user input. The touch panel also has a function of detecting a location of a user's touch with his/her finger, a specially provided pen, or the like. The user can give a processing instruction to the information processing terminal by directly touching the display screen displayed on the touch panel.

For example, JP 2012-053900A discloses a technology for recognizing characters handwritten on a display 11 using a stylus 57 by a user and displaying the recognized characters on the display 11. Also, JP H11-282961A discloses a technology for storing information regarding an individual stroke input on an input surface of a tablet by a user using a stylus pen and for generating handwritten data as stroke strings aligned in a stroke order.

SUMMARY

However, in the foregoing technologies, user convenience is low at the time of correction of input text. For example, in the foregoing technologies, users have trouble deleting target characters from input text once, and then re-inputting characters again, which may cause inconvenience.

Accordingly, it is desirable to provide a novel and improved information processing apparatus, a novel and improved information processing method, and a novel and improved program capable of improving convenience at the time of correction of input text.

According to an embodiment of the present disclosure, there is provided an information processing apparatus including a text extraction unit configured to extract text selected through a touch operation of a user from an input text string displayed on a display screen, a text specifying unit configured to specify change text of the selected text, and a selection conclusion unit configured to conclude that the selected text on the display screen is replaced with the change text.

According to an embodiment of the present disclosure, there is provided an information processing method including extracting text selected through a touch operation of a user from an input text string displayed on a display screen, specifying change text of the selected text, and concluding that the selected text on the display screen is replaced with the change text.

According to an embodiment of the present disclosure, there is provided a program causing a computer to function as a text extraction unit configured to extract text selected through a touch operation of a user from an input text string displayed on a display screen, a text specifying unit configured to specify change text of the selected text, and a selection conclusion unit configured to conclude that the selected text on the display screen is replaced with the change text.

According to an embodiment of the present disclosure described above, it is possible to improve convenience at the time of correction of input text.

DETAILED DESCRIPTION OF THE EMBODIMENTS

Figure 1:
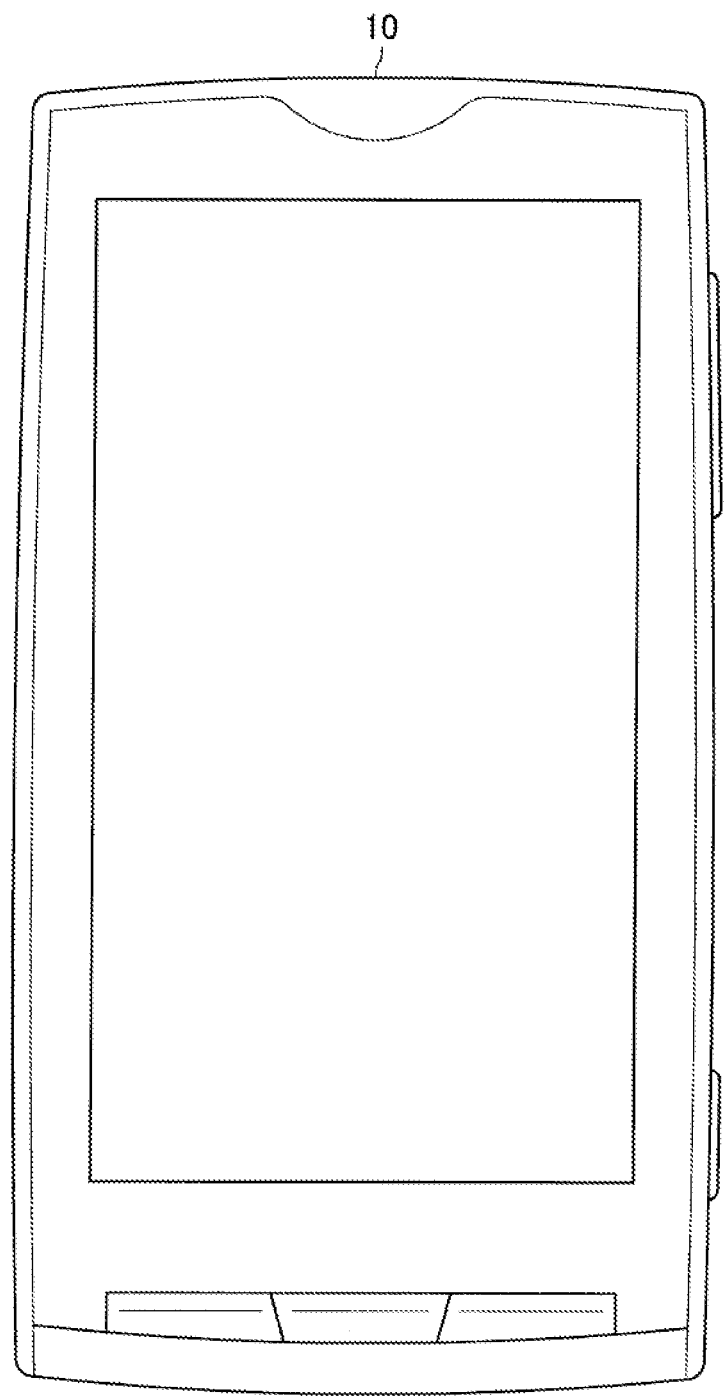
FIG. 1 is a diagram illustrating the outer appearance of an information processing apparatus 10 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, preferred embodiments of the present disclosure will be described in detail with reference to the appended drawings. Embodiments of the present disclosure can be realized in diverse forms, as will be described in detail in "1. Detailed description of embodiment of the present disclosure" as an example. Also, "DETAILED DESCRIPTION OF THE EMBODIMENTS" will be described in the order of the following items.

1. Detailed description of embodiment of the present disclosure
   1-1. Basic configuration
   1-2. Configuration
   1-3. Operation
   1-4. Advantages
2. Modification examples Throughout the present specification and the drawings, the same reference numerals are given to constituent elements having substantially the same functional configuration and repeated description thereof will be omitted.

Throughout the present specification and the drawings, different letters of the Roman alphabet are suffixed to the same numerals to distinguish a plurality of constituent elements having substantially the same functional configuration from each other in some cases. For example, a plurality of constituent elements having substantially the same functional configuration are distinguished from each other, as necessary, as in an input text string 20a and an input text string 20b. However, when it is not particularly necessary to distinguish a plurality of constituent elements having substantially the same functional configuration, only the same reference numeral is given. For example, when it is not particularly necessary to distinguish the input text string 20a and the input text string 20b from each other, the input text string 20a and the input text string 20b are simply referred to as the input text strings 20.

1. Detailed Description of Embodiment of First Disclosure

[1-1. Basic Configuration]
(1-1-1. Overview)

First, a basic configuration of an information processing apparatus 10 according to a first embodiment will be described with reference to FIG. 1. As illustrated in FIG. 1, the information processing apparatus 10 is an information processing terminal including a display. The information processing apparatus 10 may be, for example, a mobile phone such as a smartphone, a tablet terminal, a personal digital assistant (PDA), a digital camera, a wristwatch, a game device, or the like.

Figure 2:
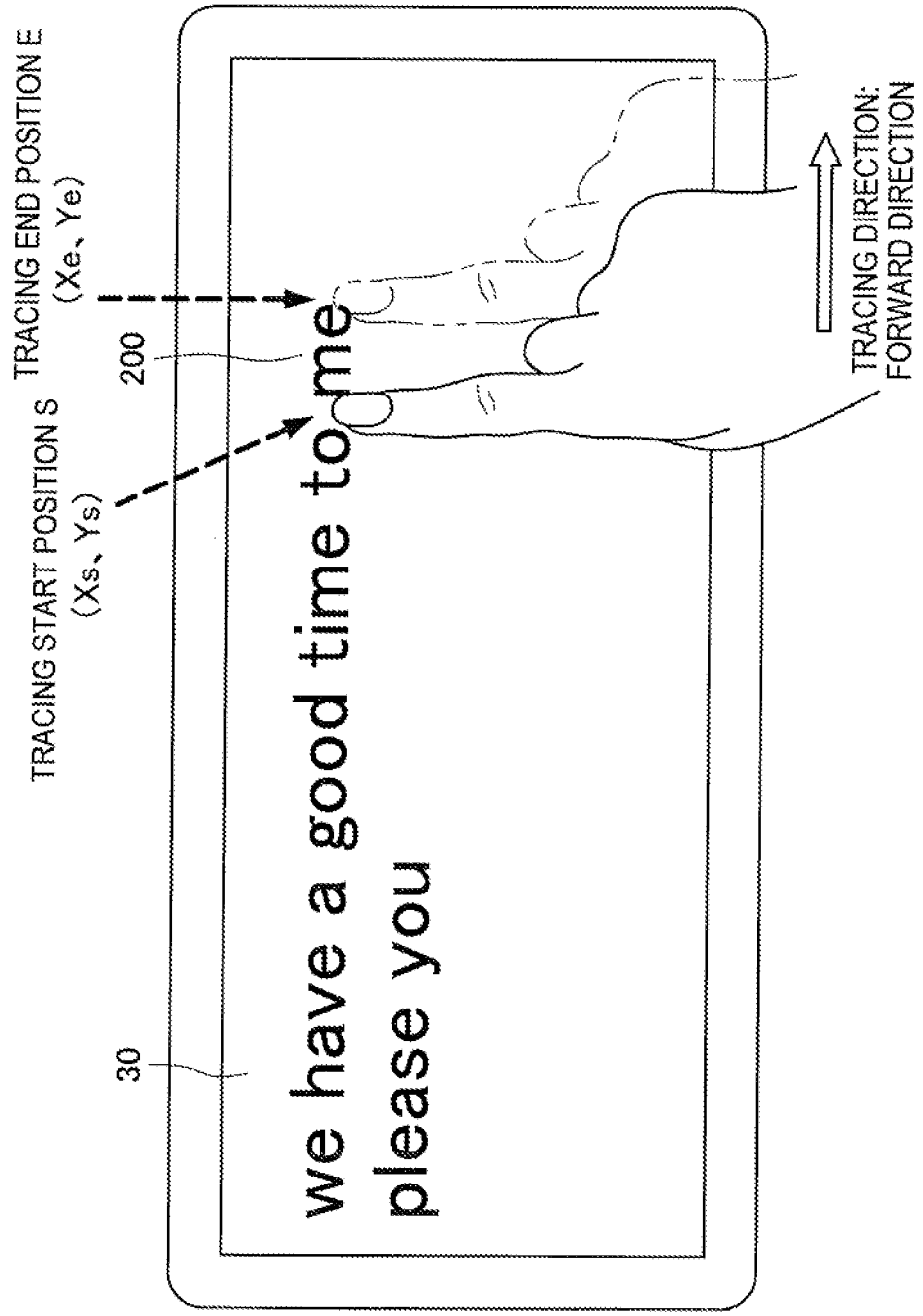
FIG. 2 is an explanatory diagram illustrating an operation example of a tracing operation according to the embodiment.

The information processing apparatus 10 can display a display screen 30 including text, for example, as illustrated in FIG. 2. Also, the information processing apparatus 10 includes a touch panel device, and thus can detect a position which a user touches on the display screen 30 with his or her finger.

Also, for example, software for editing text such as a memo can be mounted on the information processing apparatus 10. Further, software for displaying a software keyboard on the display screen 30 or software for recognizing characters handwritten on the display screen 30 can be mounted on the information processing apparatus 10. For example, the user can freely input or edit a text string using the software keyboard displayed on the display screen 30 or by performing a handwriting input on a handwriting input screen.

Also, for example, the information processing apparatus 10 can also have a function of recognizing an audio collected by a microphone or the like provided in the information processing apparatus 10. Further, the information processing apparatus 10 can convert the recognized audio into a text string, and then display the converted text string on the display screen 30. Also, the information processing apparatus 10 can perform audio recognition based on electronic data obtained by recording an audio and convert the electronic data into a text string.

(1-1-2. Summarization of Problems)

Figure 3:
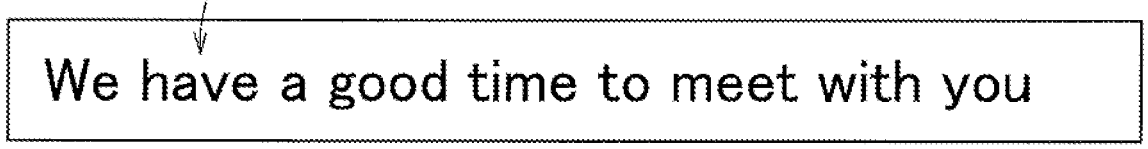
FIG. 3 is an explanatory diagram illustrating an example of an input text string.
Figure 4:
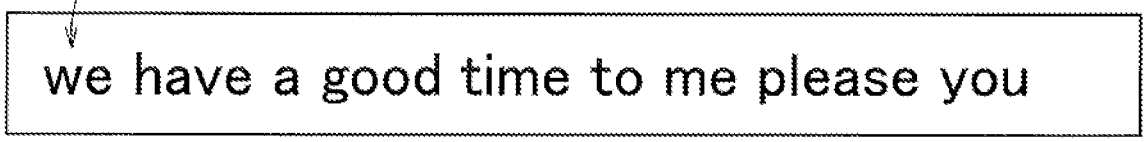
FIG. 4 is an explanatory diagram illustrating an example of an input text string.

However, when a user intends to input text using various kinds of software or the audio recognition function described above, there is a probability of erroneously inputting the text. For example, even when the user inputs a text string 20a, as illustrated in FIG. 3, there is a probability of inputting an erroneous text string 20b, as illustrated in FIG. 4, due to a recognition error of audio recognition or a typing mistake of the user. For example, in the text string 20b illustrated in FIG. 4, an erroneous input or the like occurs in that the word "me" is input instead of the word "meet" in the text string 20a illustrated in FIG. 3.

When the user detects the above-described erroneous input of the text, the user normally desires to correct the erroneously input portion. Also, even when the user correctly inputs text, the user may desire to correct part of the input text after the input. For this reason, it is desirable for the user to be able to easily correct the input text.

In the technologies of the related art, however, there are circumstances in which user convenience is low at the time of correction of input text. For example, in the technologies of the related art, a user has trouble deleting target characters from input text once, and then re-inputting characters again. Also, in the technologies of the related art, there are technologies for displaying text of a plurality of correction candidates on a display screen through an operation of the user. In these technologies, since it is necessary for a user to search for desired text from the text of the plurality of correction candidates displayed on the display screen, it may be troublesome for the user in some cases.

Accordingly, in view of such circumstances, the information processing apparatus 10 according to embodiments of the present disclosure has been conceived. The information processing apparatus 10 according to embodiments of the present disclosure is capable of improving convenience at the time of correction of input text.

(1-1-3. Hardware Configuration)

Figure 5:
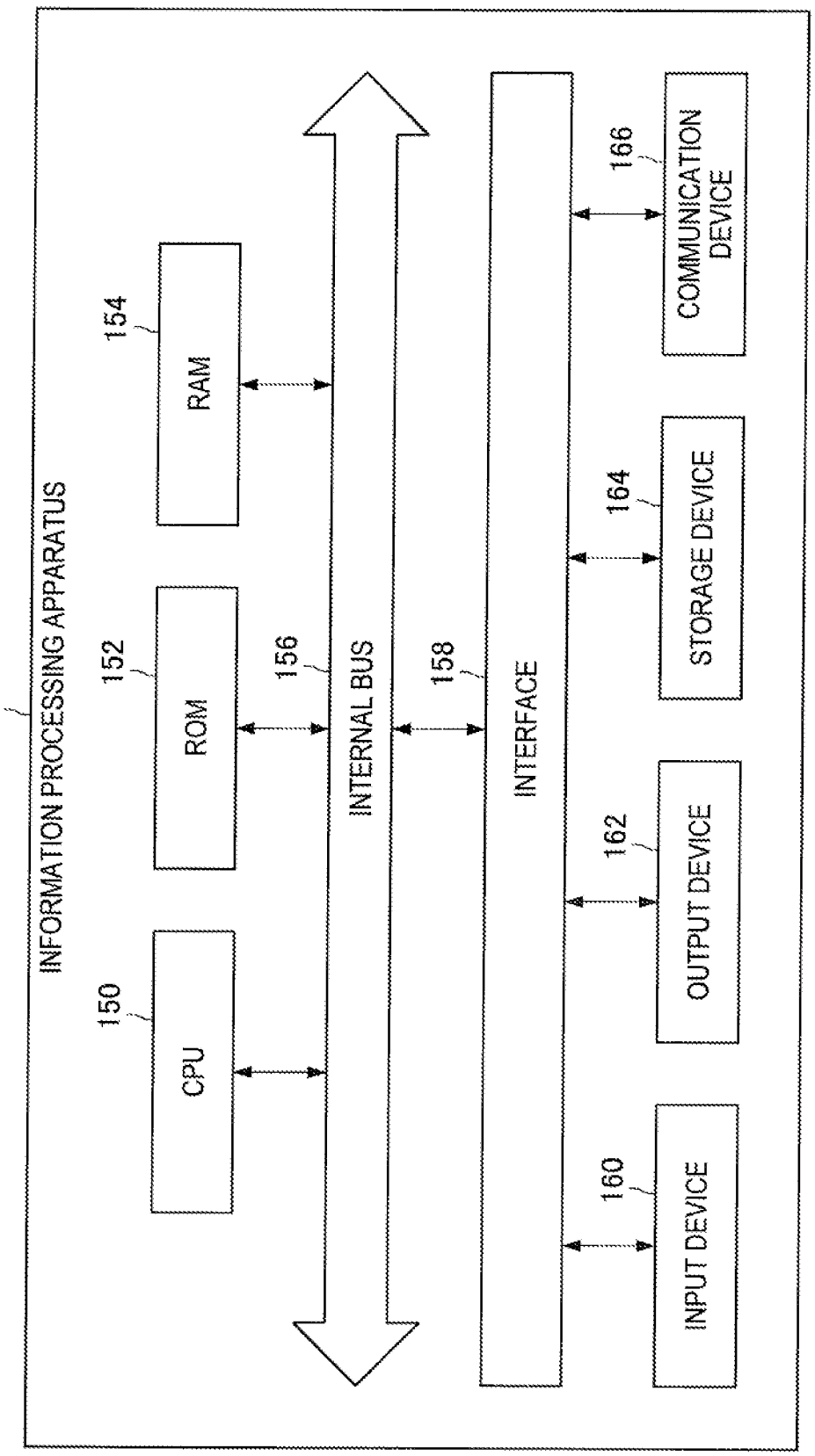
FIG. 5 is an explanatory diagram illustrating a hardware configuration of the information processing apparatus 10 according to the embodiment.

Note that the information processing apparatus 10 has a hardware configuration as illustrated in FIG. 5, for example. As illustrated in FIG. 5, the information processing apparatus 10 includes a CPU (Central Processing Unit) 150, a ROM (Read Only Memory) 152, a RAM (Random Access Memory) 154, an internal bus 156, an interface 158, an input device 160, an output device 162, a storage device 164, and a communication device 166.

The CPU 150 is configured as an example of a control unit 100 to be described later. The CPU 150 functions as an arithmetic processing unit and a controller device, and controls overall operations in the information processing apparatus 10 according to various programs. The CPU 150 may be a microprocessor.

The ROM 152 stores therein programs and operational parameters which are used by the CPU 150. The RAM 154 temporarily stores therein the programs used and executed by the CPU 150, parameters appropriately varying in executing the programs, and the like. The CPU 150, the ROM 152, and the RAM 154 are connected to each other via the internal bus 156 configured of a CPU bus or the like.

The interface 158 connects the input device 160, the output device 162, the storage device 164, and the communication device 166 with the internal bus 156. For example, the input device 160 exchanges data with the CPU 150 and the like through the interface 158 and the internal bus 156.

The input device 160 is configured as an example of a sentence input unit 122 and a touch operation unit 124 to be described later. The input device 160 includes: input means used by the user for imputing information, such as a touch panel, a button, a microphone, or a switch; an input control circuit configured to generate an input signal based on user input and to output the signal to the CPU 150; and the like. By operating the input device 160, the user can input various data into the information processing apparatus 10 and instruct the information processing apparatus 10 to perform a processing operation.

The output device 162 is configured as an example of an output unit 120 to be described later. The output device 162 includes a display device such as a liquid crystal display (LCD: Liquid Crystal Display) device, an OLED (Organic Light Emitting Diode) device, or a lamp. Further, the output device 162 includes a sound output device such as a speaker. For example, the display device displays a captured image, a generated image, and the like. In contrast, the sound output device outputs sound converted from sound data or the like.

The storage device 164 is a device for data storage, such as a hard disk. The storage device 164 may include a storage medium, a recording device which records data in a storage medium, a reader device which reads data from a storage medium, a deletion device which deletes data recorded in a storage medium, and the like. The storage device 164 stores therein the programs executed by the CPU 150 and various data.

The communication device 166 is a communication interface configured of a communication device or the like for connecting to a communication network such as a public network or the Internet. The communication device 166 may also be a communication device supporting a wireless LAN (Local Area Network), a communication device supporting LTE (Long Term Evolution), or a wired communication device configured to perform communication in a wired manner.

[1-2. Configuration]

Figure 6:
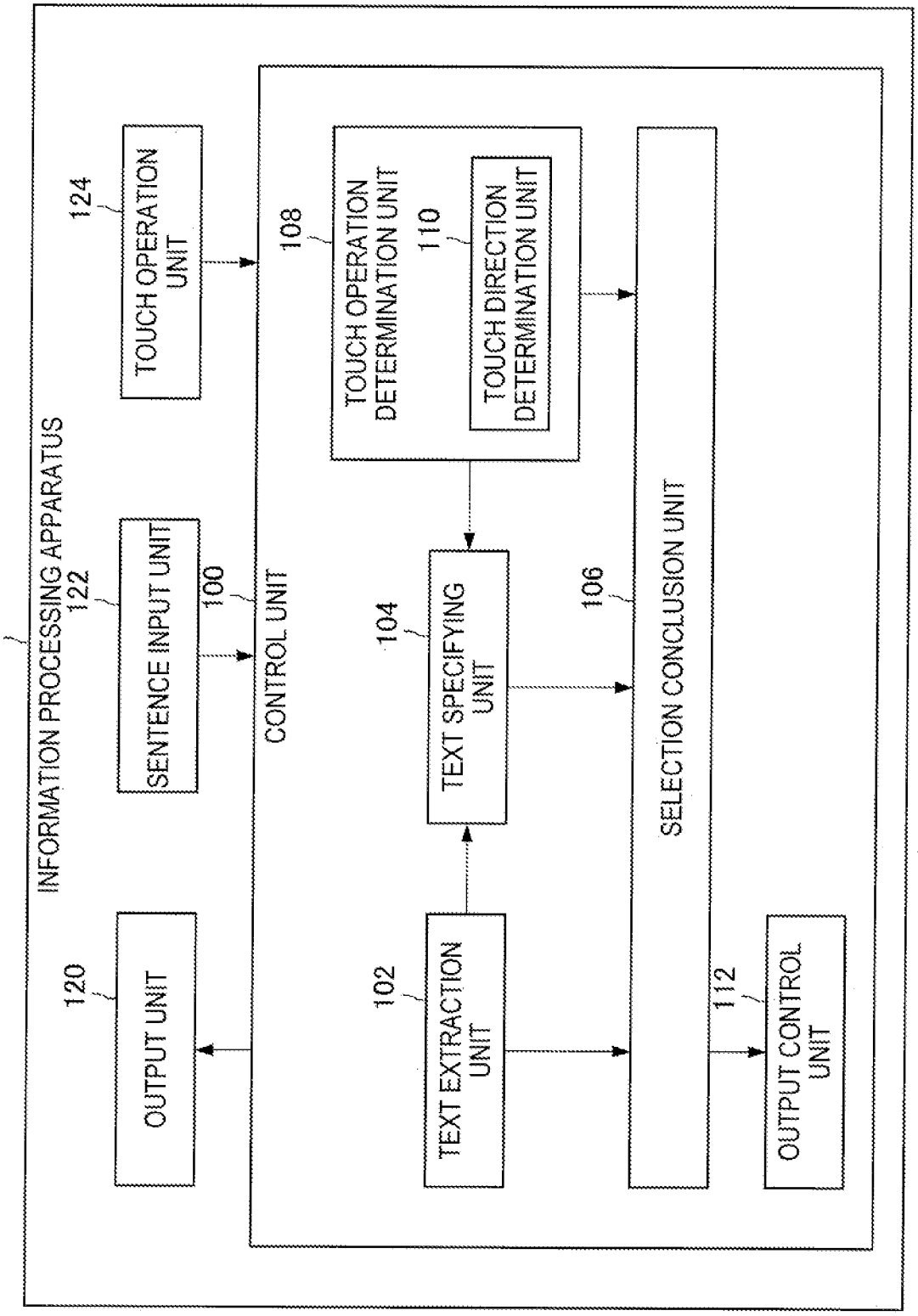
FIG. 6 is a functional block diagram illustrating the configuration of the information processing apparatus 10 according to the embodiment.

The basic configuration of the information processing apparatus 10 according to the embodiment of the present disclosure has been described above. Next, the configuration according to the embodiment of the present disclosure will be described in detail. FIG. 6 is a functional block diagram illustrating the configuration of the information processing apparatus 10 according to the embodiment of the present disclosure. As illustrated in FIG. 6, the information processing apparatus 10 according to the embodiment of the present disclosure includes a control unit 100, an output unit 120, a sentence input unit 122, and a touch operation unit 124. Also, the control unit 100 includes a text extraction unit 102, a text specifying unit 104, a selection conclusion unit 106, a touch operation determination unit 108, and an output control unit 112. Also, the touch operation determination unit 108 includes a touch direction determination unit 110.

(1-2-1. Control Unit 100)

The control unit 100 has a function of generally controlling operations of the information processing apparatus 10 using the hardware such as the CPU 150 and the RAM 154 included in the information processing apparatus 10. For example, the control unit 100 controls operations of the output unit 120, the sentence input unit 122, and the touch operation unit 124.

(1-2-2. Text Extraction Unit 102)

The text extraction unit 102 extracts text selected through a touch operation of the user from an input text string displayed on the display screen 30. Here, the touch operation of the user is, for example, an operation of the user tracing selection target text on the display screen 30 with a finger or a specially provided pen such as a stylus. In the tracing operation, a selection start position of the user is specified when the touch operation unit 124 to be described later specifies a position which the finger or the specially provided pen touches on the display screen 30. Then, a selection end position of the user is specified when a position at which the finger or the specially provided pen is detached from the display screen 30 or a position at which movement of the finger or the specially provided pen is stopped is specified. Therefore, the text extraction unit 102 can accurately extract text located in a range desired to be selected by the user from the input text string.

For example, as illustrated in FIG. 2, when the finger of the user traces from a tracing start position S to a tracing end position E on the display screen 30, the text extraction unit 102 can extract the word "me" as selection target text from the displayed input text string.

Also, in the present specification, a case in which a touch operation of the user is a tracing operation will be mainly described below. However, an embodiment of the present disclosure is not limited to this example, but the touch operation may be, for example, an operation of moving a finger on the display screen 30 so that selection target text is surrounded in a circular form. Also, the touch operation may be an operation of the user selecting a start position and an end position of a selection target text, for example, by spreading two fingers and touching (multi-touch) the display screen 30. Also, the touch operation may be an operation of designating a selection target text by performing pinch-out or pinch-in on the display screen 30. Also, the touch operation may be an operation of designating selection target text by performing a long touch operation on a start position of the selection target text with a finger or a specially provided pen. More specifically, in the long touch operation, when the user remains touching the display screen 30, a selection range may be expanded word by word in a text forward direction from the touched position for each predetermined time interval by the information processing apparatus 10. In addition, when the user removes his or her finger or the specially provided pen from the display screen 30, an end position of the selection range may be concluded.

Also, the text may be a word or a character string in which two or more words are connected. Also, when a language of the input text string is, for example, Japanese or Chinese, the text may be, for example, a morpheme subjected to morphological analysis by the text extraction unit 102 or may be a character string in which two or more morphemes are connected.

Also, when a second tracing operation is performed after a first tracing operation by the user, the text extraction unit 102 can extract second selected text, which is text selected through the second tracing operation, from the input text string. Also, the second tracing operation may be, for example, an operation which can be performed immediately after the first tracing operation.

(1-2-3. Text Specifying Unit 104)

Figure 7:
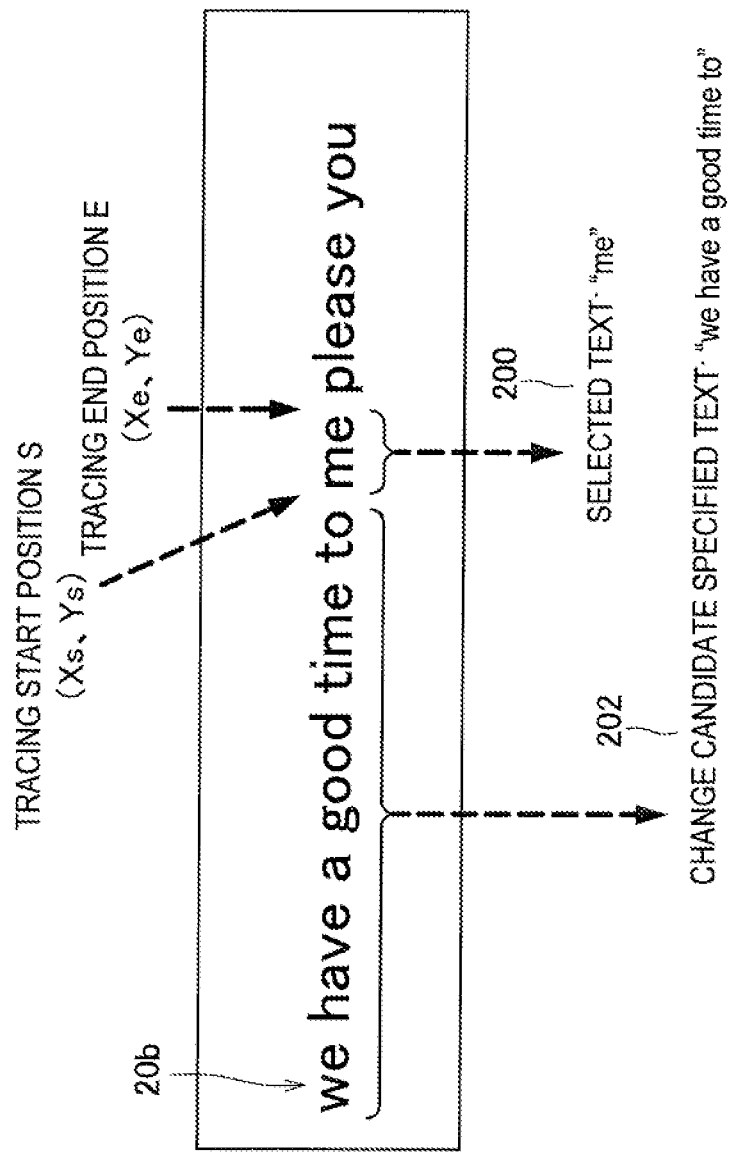
FIG. 7 is an explanatory diagram illustrating an extraction example of selected text according to the embodiment.

The text specifying unit 104 specifies change text of the text selected through a tracing operation of the user. More specifically, the text specifying unit 104 can specify a plurality of items of change text based on text located prior to the selected text. For example, as illustrated in FIG. 7, the text specifying unit 104 can first extract a text string immediately before selected text 200 from the beginning of a sentence as change candidate specified text 202 from one sentence including the selected text 200. Then, as illustrated in FIG. 8, the text specifying unit 104 can specify a change candidate group 204 based on an evaluation value for connection to the rear of the change candidate specified text 202.

Figure 8:
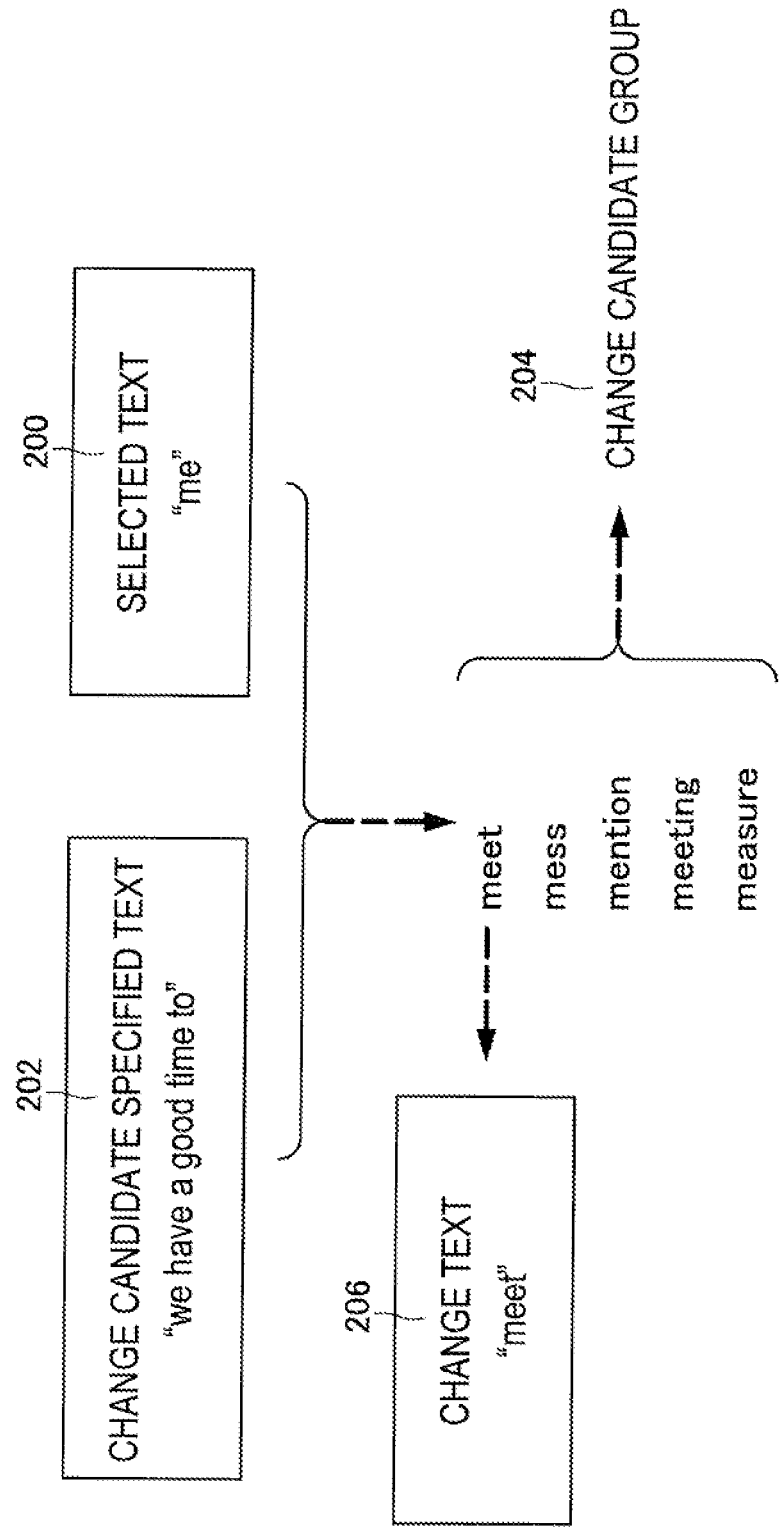
FIG. 8 is an explanatory diagram illustrating a specific example of change text according to the embodiment.

For example, as illustrated in FIG. 8, since the word "meet" has a high evaluation value as the evaluation value for connection to the rear of the change candidate specified text 202, "we have a good time to," the text specifying unit 104 can specify the word "meet" as one from the change candidate group 204.

Also, as a modification example, the text specifying unit 104 can also specify the change candidate group 204 based on the evaluation value for connection to the rear of the change candidate specified text 202 and similarity of sound (reading) of text. For example, since the sound of the word "me" is similar to the sound of the word "meet," the text specifying unit 104 may specify the word "meet" as one from the change candidate group 204.

(1-2-4. Selection Conclusion Unit 106)

The selection conclusion unit 106 concludes that text selected on the display screen 30 by a user is replaced with change text specified by the text specifying unit 104. More specifically, the selection conclusion unit 106 can conclude that the selected text is replaced with one of the plurality of items of change text based on the evaluation value for connection of the text (the change candidate specified text 202) located prior to the selected text to each item of change text. For example, the selection conclusion unit 106 can conclude that the selected text is replaced with the change text with the highest evaluation value for connection of the change candidate specified text 202 to each item of change text.

Figure 9:
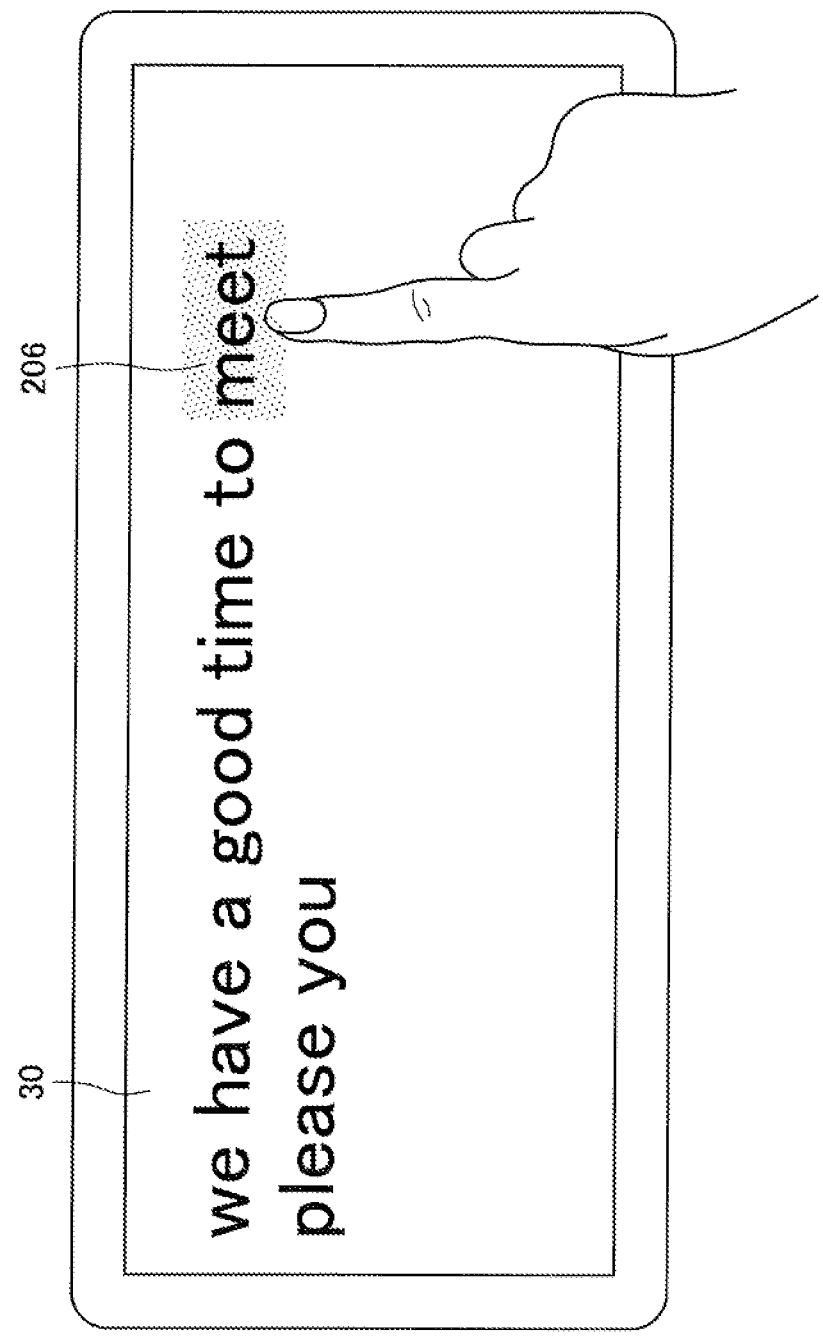
FIG. 9 is an explanatory diagram illustrating a display example of replaced text according to the embodiment.

In the example illustrated in FIG. 8, for example, when a word having the highest evaluation value for connection to the rear of the change candidate specified text 202, "we have a good time to," is "meet," as illustrated in FIG. 9, the selection conclusion unit 106 may conclude that the original word "me" on the display screen 30 is replaced with the word "meet."

In the conclusion example, since the selection conclusion unit 106 selects one item of change text from the change candidate group 204 based on the evaluation value for connection to the rear of the change candidate specified text 202, the selection conclusion unit 106 can select the change text so that the change text is natural in the input text string in the context.

Also, the foregoing evaluation value may be calculated in combination with a predictive transform technology. In this example, the selection conclusion unit 106 can select change text that is highly likely to be selected by more users from the change candidate group 204.

Also, the foregoing evaluation value may be calculated by, for example, the selection conclusion unit 106 or the text specifying unit 104, or may be calculated in association with the change candidate specified text 202 and the change candidate group 204 in advance to be recorded as a database. Also, the information processing apparatus 10 can store the foregoing database or can receive the evaluation value from another apparatus that stores the foregoing database.

Also, when the touch operation determination unit 108 to be described later determines that the selection target text is the same between the first and second tracing operations and the touch direction determination unit 110 to be described later determines that an operation direction of the second tracing operation is the text forward direction, the selection conclusion unit 106 can conclude that the second selected text is replaced with change text with the second highest evaluation value for connection of the change candidate specified text 202 to each item of change text by the first tracing operation.

Figure 10:
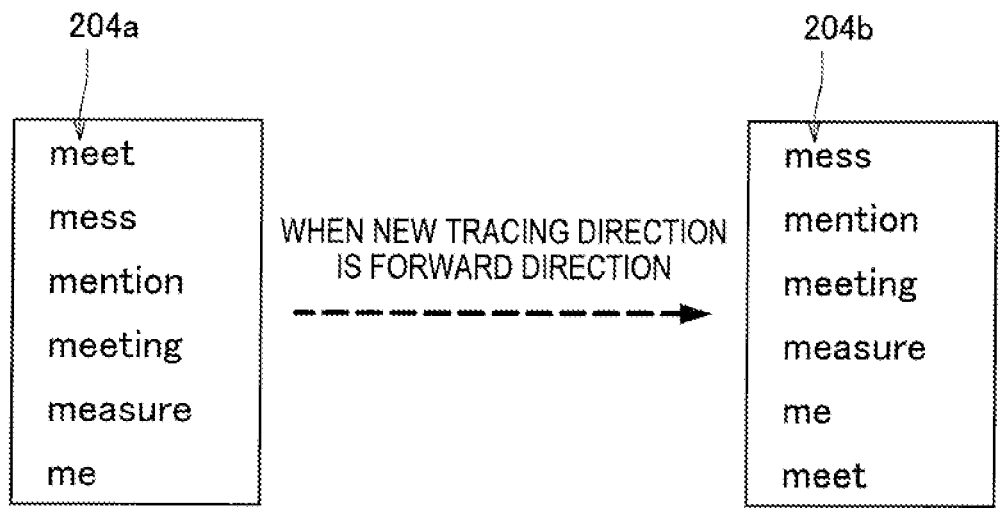
FIG. 10 is an explanatory diagram illustrating an example of rearrangement of a change candidate group when a tracing direction is a forward direction according to the embodiment.

Here, the foregoing function will be described in more detail with reference to FIG. 10. Also, a change candidate group 204a illustrated in FIG. 10 is an example in which a plurality of items of change text specified through the first tracing operation by the text specifying unit 104 are arranged in order of a higher evaluation value. Also, as illustrated in FIG. 10, the original text ("me") before the replacement in the first tracing operation can be arranged immediately after the change candidate group 204a.

In the example illustrated in FIG. 10, for example, when the selection target text is determined to be the same between the first and second tracing operations and the operation direction of the second tracing operation is determined to be the text forward direction, the selection conclusion unit 106 may conclude that the second selected text is replaced with "mess" which is the change text with the second highest evaluation value. In the conclusion example, when the replaced text by the first tracing operation is different from text desired by the user, the user can replace the selection target text with the desired text by repeating the tracing operation in substantially the same range.

Also, when the selection target text is determined to be the same between the first and second tracing operations and the operation direction of the second tracing operation is determined to be the text backward direction, the selection conclusion unit 106 can conclude that the second selected text is replaced with the original text before the replacement in the first tracing operation.

Here, the foregoing function will be described in more detail with reference to FIG. 11. Also, the change candidate group 204a illustrated in FIG. 11 is the same as the change candidate group 204a illustrated in FIG. 10.

Figure 11:
FIG. 11 is an explanatory diagram illustrating an example of the rearrangement of the change candidate group when the tracing direction is a backward direction according to the embodiment.

In the example illustrated in FIG. 11, for example, when the selection target text is determined to be the same between the first and second tracing operations and the operation direction of the second tracing operation is determined to be the text backward direction, the selection conclusion unit 106 may conclude that the second selected text is replaced with "me" which is the original text before the replacement in the first tracing operation. In the conclusion example, the user re-corrects the text to the text before the replacement in the first tracing operation by tracing substantially the same range in the backward direction, that is, the user can restore the replaced text.

Also, in the first tracing operation, even when the operation direction is the text backward direction, the selection conclusion unit 106 may conclude that the selected text is replaced with the change text with the highest evaluation value.

Also, as a modification example, when the selection target text is determined to be the same between the first and second tracing operations and the operation direction of the second tracing operation is determined to be the text backward direction, the selection conclusion unit 106 may conclude that the second selected text is replaced with change text of which an evaluation value for connection of the change candidate specified text 202 to each item of change text by the first tracing operation is lower than the second highest evaluation value, e.g., the third highest evaluation value.

(1-2-5. Touch Operation Determination Unit 108)

The touch operation determination unit 108 determines whether selection target text is the same between the first and second tracing operations by comparing the start position or the end position of the first tracing operation to the start position or the end position of the second tracing operation.

More specifically, when the touch direction determination unit 110 determines that the operation direction of the first tracing operation is the same as that of the second tracing operation and a value according to a difference between the start position of the first tracing operation and the start position of the second tracing operation is less than a predetermined threshold value, the touch operation determination unit 108 can determine that the selection target text is the same between the first and second tracing operations.

Figure 12:
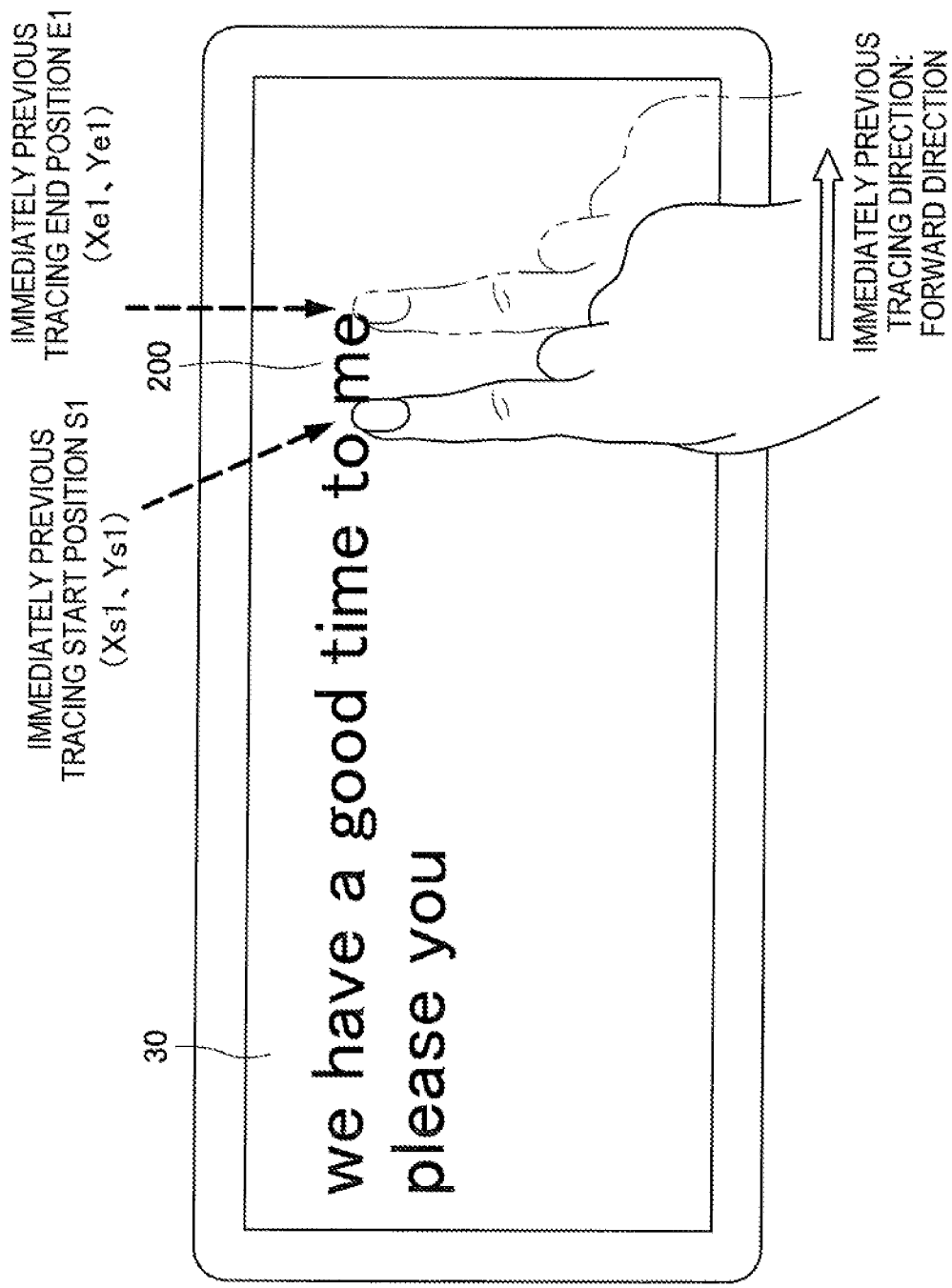
FIG. 12 is an explanatory diagram illustrating an example of operation determination of a first tracing operation according to the embodiment.

Here, the foregoing function will be described in more detail with reference to FIGS. 12 to 14. FIG. 12 is an explanatory diagram illustrating an example of a tracing start position S1 and a tracing end position E1 of the immediately previous tracing operation (first tracing operation). Also, FIGS. 13 and 14 are explanatory diagrams illustrating an example of a tracing start position S2 and a tracing end position E2 of a new tracing operation (second tracing operation) together with the tracing start position S1 and the tracing end position E1 of the immediately previous operation.

Figure 13:
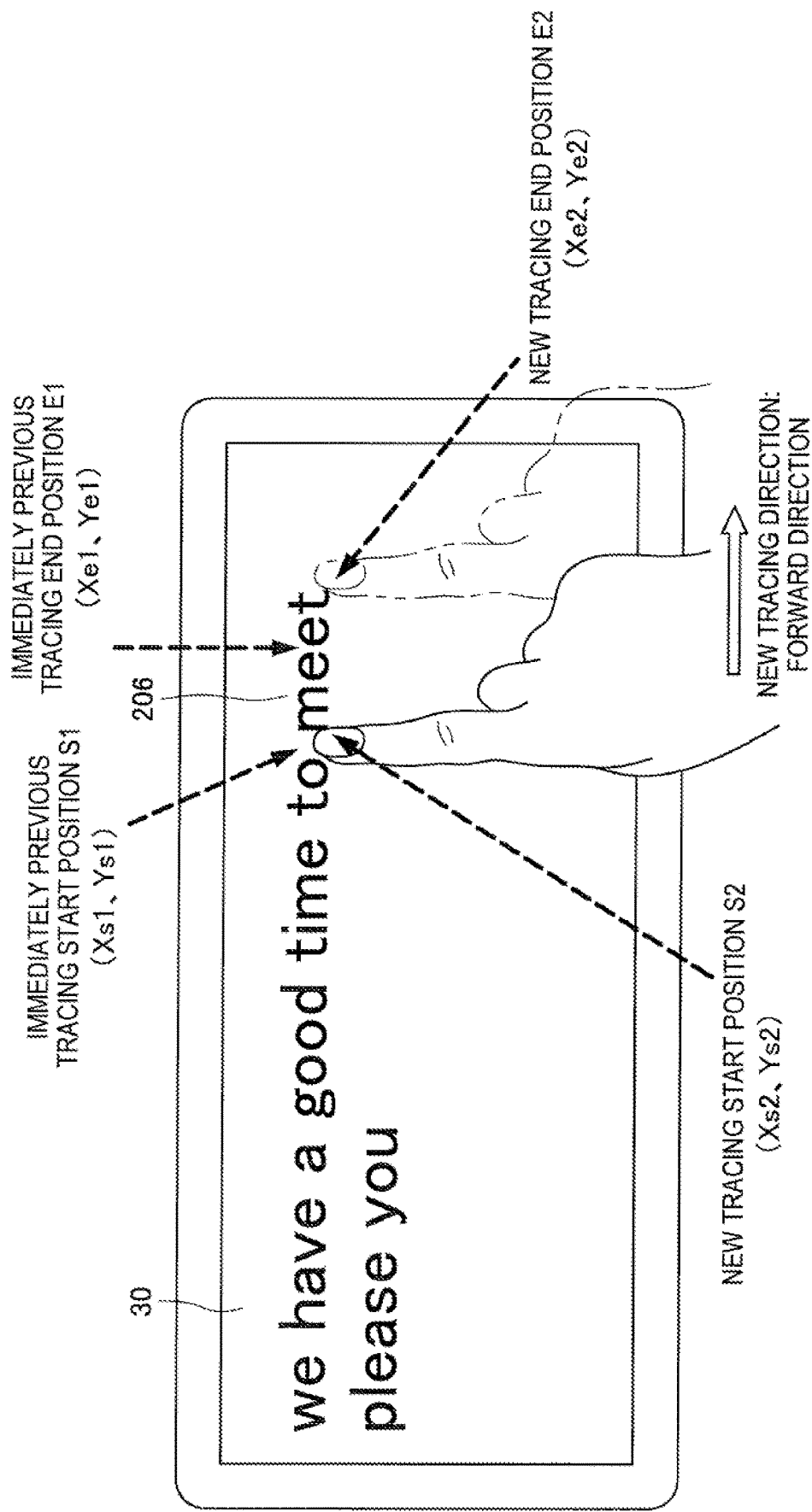
FIG. 13 is an explanatory diagram illustrating an example of operation determination of a second tracing operation according to the embodiment.

In the example illustrated in FIG. 13, for example, when it is decided that the absolute value of a difference between the tracing start position S1 (that is, the vicinity of the beginning of the word "me") of the immediately previous tracing operation and a tracing start position S2 (that is, the vicinity of the beginning of the word "meet") of a new tracing operation is less than a predetermined threshold value, the touch operation determination unit 108 may determine that selection target text is the same between the immediately previous tracing operation and the new tracing operation. More specifically, when the absolute value of a difference between the Y coordinate value (=Ys1) of S1 and the Y coordinate value (=Ys2) of S2 is less than the predetermined threshold value and the absolute value of a difference between the X coordinate value (=Xs1) of S1 and the X coordinate value (=Xs2) of S2 is less than the predetermined threshold value, the touch operation determination unit 108 may determine that the selection target text is the same between the immediately previous tracing operation and the new tracing operation. In general, even when the user intends to touch the same position, it is difficult for the first touch position and the second touch position to be completely the same. For this reason, the touch operation determination unit 108 can accurately determine whether the user intends to select the text at the same position between the immediately previous tracing operation and the new tracing operation by comparing the absolute value of the difference between S1 and S2 to the predetermined threshold value.

Figure 14:
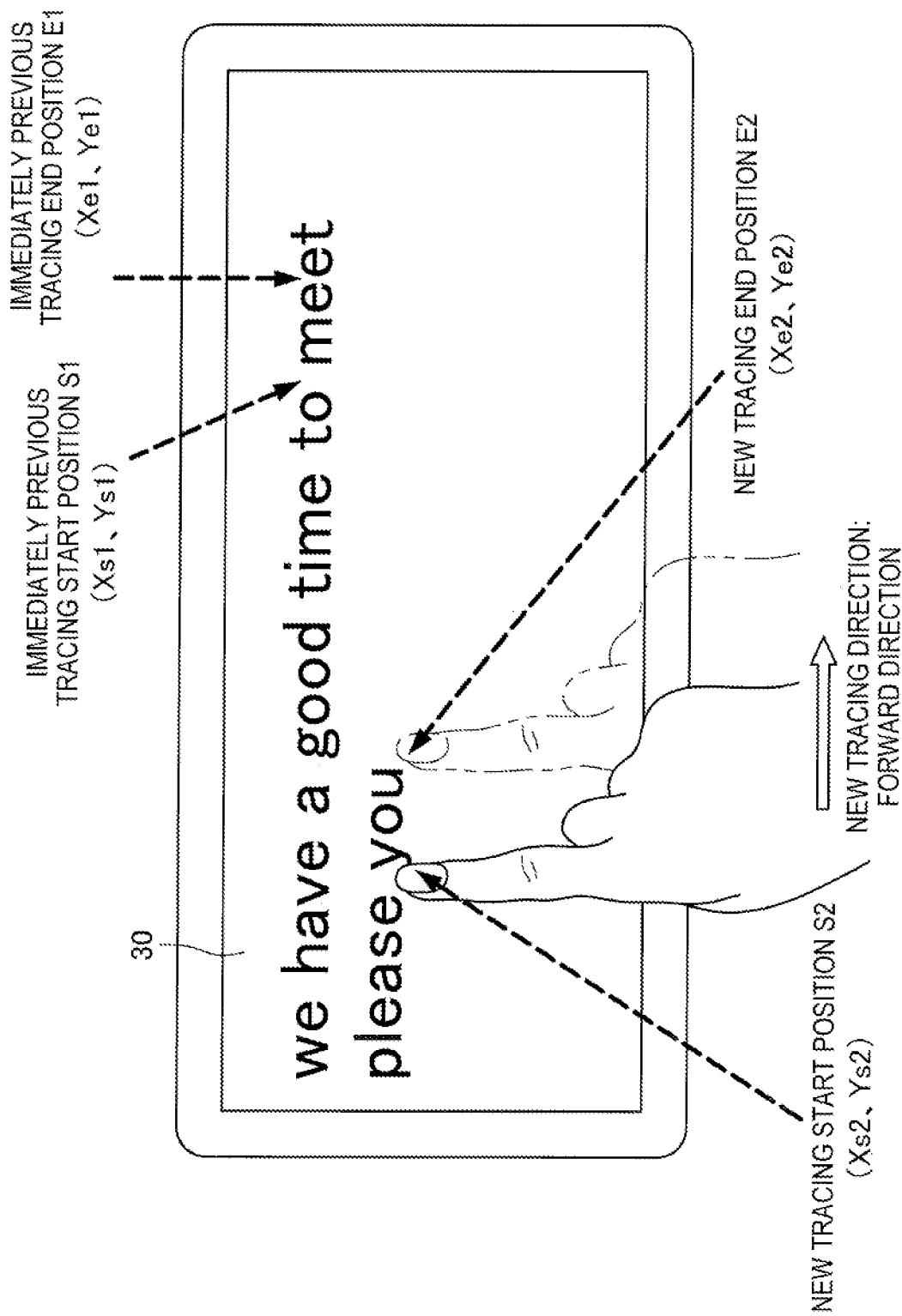
FIG. 14 is an explanatory diagram illustrating an example of the operation determination of the second tracing operation according to the embodiment.

Also, as illustrated in FIG. 14, when it is decided that the absolute value of the difference between the tracing start position S1 of the immediately previous tracing operation and the tracing start position S2 of the new tracing operation is equal to or greater than the predetermined threshold value, the touch operation determination unit 108 may determine that the selection target text is different between the immediately previous tracing operation and the new tracing operation.

Also, when the touch direction determination unit 110 determines that the operation direction is the same between the first and second tracing operations and a value according to a difference between the end position of the first tracing operation and the end position of the second tracing operation is less than a predetermined threshold value, the touch operation determination unit 108 can determine that the selection target text is the same between the first and second tracing operations.

Figure 15:
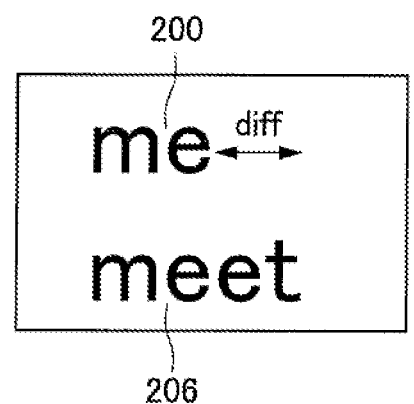
FIG. 15 is an explanatory diagram illustrating an example of a difference in the ending of a word between selected text and change text.

Here, the foregoing function will be described in more detail with reference to FIG. 15. FIG. 15 is an explanatory diagram illustrating the selected text 200 (the word "me") by the immediately previous tracing operation together with change text 206 (the word "meet") replaced after the immediately previous tracing operation. As illustrated in FIG. 15, since the number of characters is not necessarily the same between the selected text 200 and the change text 206, a difference in the ending of a word can occur by a distance diff between the selected text 200 and the change text 206.

For this reason, for example, the touch operation determination unit 108 first calculates a value of ||E1−E2|−diff|. Then, when the calculated value is less than a predetermined threshold value, the touch operation determination unit 108 may determine that the selection target text is the same between the first and second tracing operations. In this determination example, even when the number of characters is not the same between the selected text 200 and the change text 206, it can be accurately determined whether the user intends to select the text at the same position between the immediately previous tracing operation and the new tracing operation.

Also, when the touch direction determination unit 110 determines that the operation direction is opposite between the first and second tracing operations and a value according to a difference between the start position of the first tracing operation and the end position of the second tracing operation is less than a predetermined threshold value, the touch operation determination unit 108 can determine that the selection target text is the same between the first and second tracing operations.

Also, when the touch direction determination unit 110 determines that the operation direction is opposite between the first and second tracing operations and a value according to a difference between the end position of the first tracing operation and the start position of the second tracing operation is less than a predetermined threshold value, the touch operation determination unit 108 can determine that the selection target text is the same between the first and second tracing operations.

Also, when the touch operation determination unit 108 determines that the selection target text is different between the first and second tracing operations, the text specifying unit 104 can specify second change text which is change text of the second selected text. Also, the selection conclusion unit 106 can conclude that the second selected text is replaced with the second change text on the display screen 30. For example, in the example illustrated in FIG. 14, the text specifying unit 104 may specify change text (second change text) of the word "you" selected through the second tracing operation and the selection conclusion unit 106 may conclude that the word "you" is replaced with the second change text.

(1-2-6. Touch Direction Determination Unit 110)

The touch direction determination unit 110 determines whether an operation direction of a tracing operation of the user is a text forward direction or a text backward direction by comparing the start position and the end position of a tracing operation of a user. More specifically, when the start position of the tracing operation of the user is located prior to the end position of the tracing operation of the user in an input text string, the touch direction determination unit 110 can determine that the operation direction of the tracing operation of the user is the text forward direction. For example, in the example illustrated in FIG. 2, since the tracing start position S is located prior to the tracing ending position E in the input text string, the touch direction determination unit 110 may determine that the operation direction of the tracing operation of the user is the text forward direction.

When the start position of the tracing operation of the user is located posterior to the end position of the tracing operation of the user in the input text string, the touch direction determination unit 110 can determine that the operation direction of the tracing operation of the user is the text backward direction.

(1-2-7. Output Control Unit 112)

The output control unit 112 replaces the selected text by the tracing operation with the change text concluded by the selection conclusion unit 106 and displays the change text on the display screen 30. Also, the output control unit 112 can perform a process (replacing feedback process) of causing the user to perceive that the selected text is replaced with the change text. More specifically, for example, as illustrated in a shaded portion in FIG. 9, the output control unit 112 can display the replaced change text in an emphatic manner on the display screen 30. For example, the output control unit 112 may surround the replaced text with a frame, change the color of a background of the replaced text, decorate the replaced text, change the font of the replaced text, or change the color of the replaced text.

Also, the output control unit 112 may automatically output an audio of the replaced text as an example of the replacing feedback process.

Alternatively, the output control unit 112 may automatically output an audio of a phrase including the change text in a replaced input text string or one word including the change text. Also, the output control unit 112 can output an audio of the change text in a more emphatic manner than other text when the foregoing audio is output. For example, the output control unit 112 may further increase the volume of the change text, may further increase the pitch of the change text, or may prolong vowels of the change text.

(1-2-8. Output Unit 120)

The output unit 120 displays, for example, the display screen 30 or outputs an audio in response to an instruction of the output control unit 112.

(1-2-9. Sentence Input Unit 122)

The sentence input unit 122 receives an input of text by the user. For example, the sentence input unit 122 can receive an input of text by a keyboard or an input of text by a software keyboard displayed on the display screen 30. Also, the sentence input unit 122 can recognize characters handwritten on the display screen 30 or receive an input of text by recognizing a sound of the user.

(1-2-10. Touch Operation Unit 124)

The touch operation unit 124 receives a touch operation of the user on the display screen 30.

Note that according to the first embodiment of the present disclosure, it is also possible to provide a computer program for causing the hardware such as the CPU 150, the ROM 152, and the RAM 154 which are built in the information processing apparatus 10 to exert functions equivalent to those in the components of the information processing apparatus 10. There is also provided a storage medium having the computer program stored therein.

Also, the configuration according to the embodiment of the present disclosure is not limited to the above-described configuration. For example, one or more of the output unit 120, the sentence input unit 122, and the touch operation unit 124 may not be included in the information processing apparatus 10, but may be included in another apparatus.

[1-3. Operation]

(1-3-1. Overall Operations)

Figure 16:
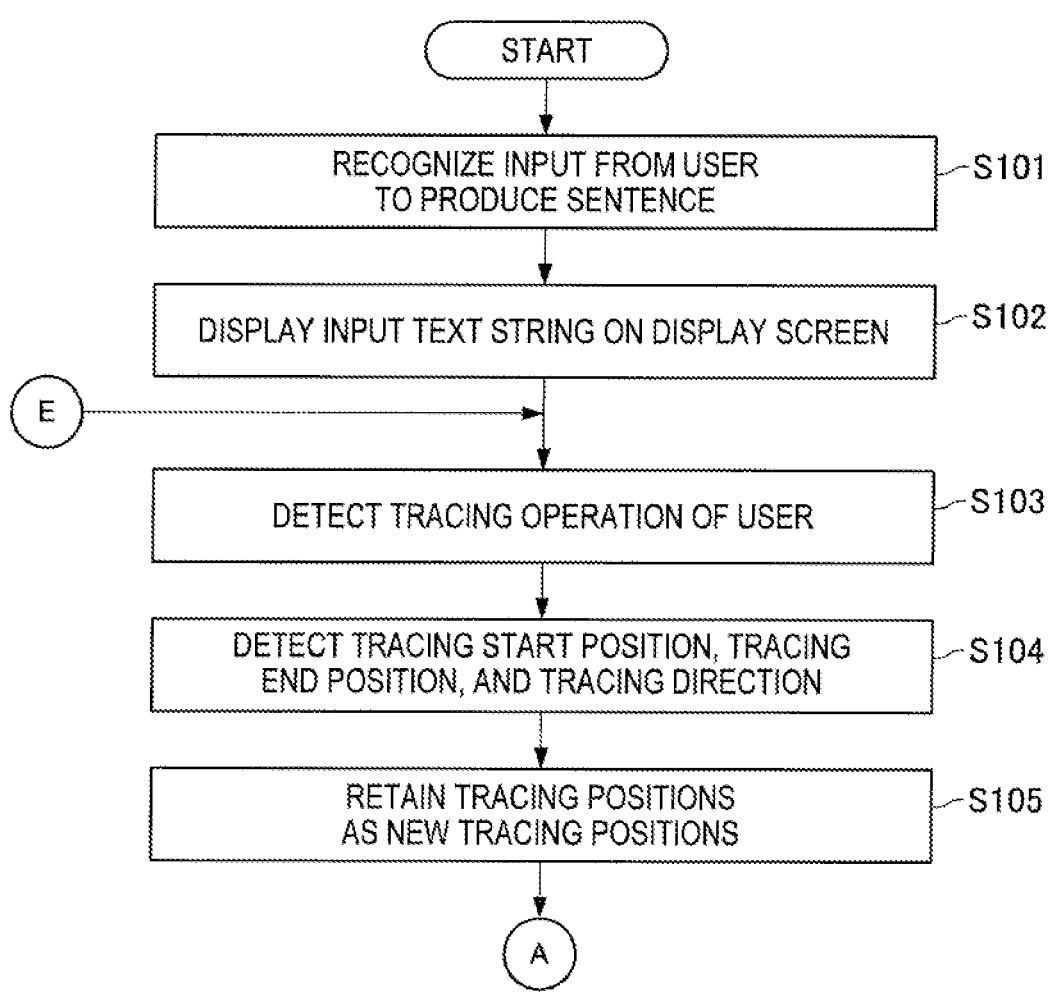
FIG. 16 is an explanatory diagram illustrating a part of an operation example according to the embodiment.

The configuration according to the embodiment of the present disclosure has been described above. Next, an operation according an embodiment of the present disclosure will be described. FIG. 16 is a flowchart illustrating part of an operation example according to the embodiment of the present disclosure.

As illustrated in FIG. 16, the sentence input unit 122 first receives an input of a text string by the user (S101). Subsequently, the output control unit 112 displays the input text string on the display screen 30 (S102). Subsequently, the touch operation unit 124 detects a tracing operation of the user (S103).

Subsequently, the touch operation unit 124 detects a start position and an end position of the tracing operation. Then, the touch direction determination unit 110 determines whether the operation direction of the tracing operation is a text forward direction or a text backward direction by comparing the start position and the end position of the tracing operation (S104).

Subsequently, the information processing apparatus 10 retains the detected start position and the detected end position of the tracing operation in, for example, the RAM 154 (S105).

Figure 17:
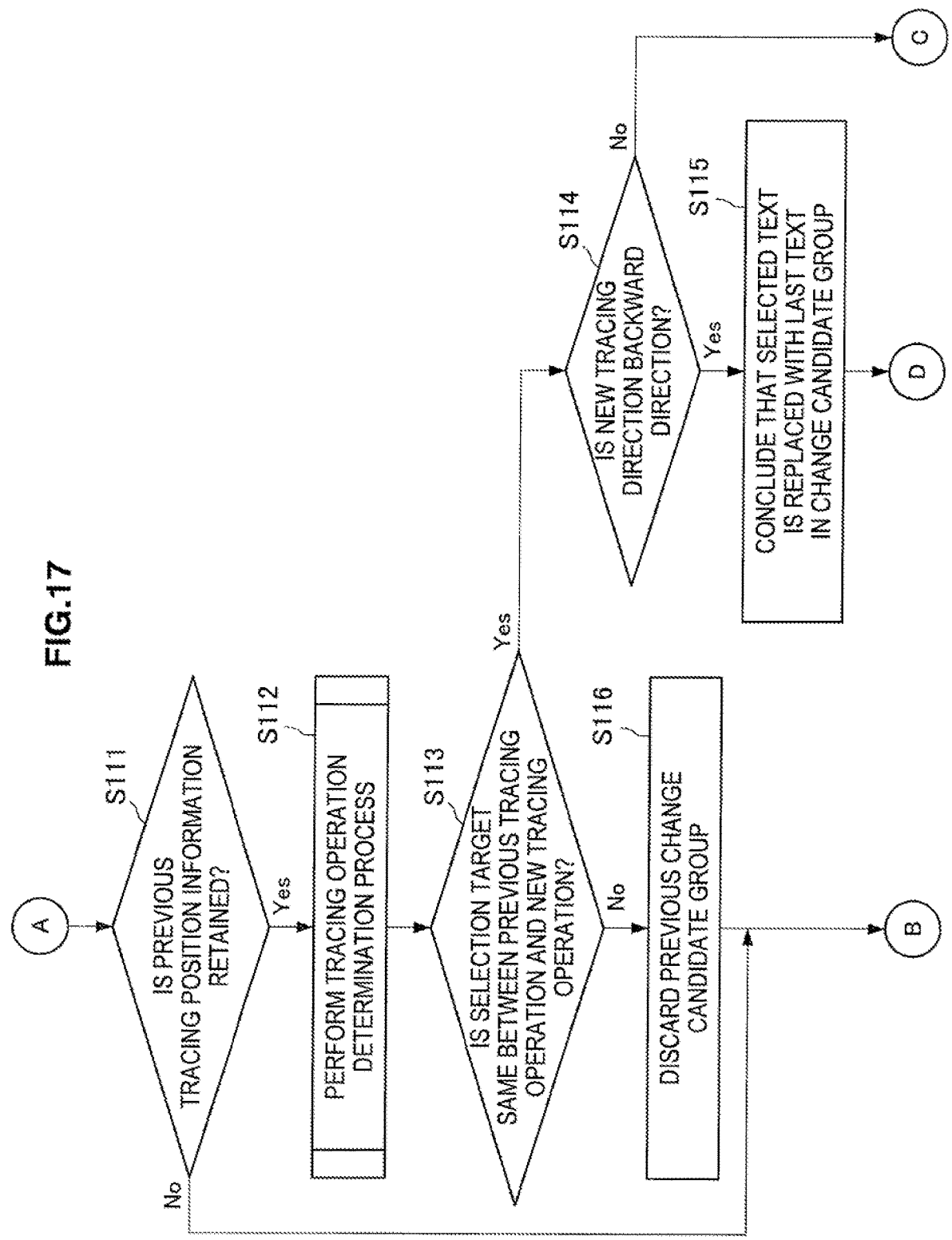
FIG. 17 is an explanatory diagram illustrating a part of the operation example according to the embodiment.

Next, an operation after S105 will be described with reference to FIG. 17. As illustrated in FIG. 17, after S105, the information processing apparatus 10 confirms whether position information of the previous tracing operation is retained in, for example, the RAM 154 (S111). For example, when the position information of the previous tracing operation is not retained, e.g., the tracing operation is the first operation (No in S111), the information processing apparatus 10 performs an operation of S121 to be described below.

Conversely, when the position information of the previous tracing operation is retained, e.g., the tracing operation is the second operation (Yes in S111), the information processing apparatus 10 performs a "tracing operation determination process" to be described below (S112).

Subsequently, the touch operation determination unit 108 determines whether the selection target text is the same between the previous tracing operation and a new tracing operation by comparing the start position or the end position of the previous tracing operation to a start position or an end position of the new tracing operation (S113).

When the touch operation determination unit 108 determines that the selection target text is the same between the previous tracing operation and the new tracing operation (Yes in S113), the touch operation determination unit 108 confirms whether the operation direction of the new tracing operation determined in S104 is the text backward direction (S114). When the operation direction of the new tracing operation is the text backward direction (Yes in S114), the selection conclusion unit 106 concludes that the text selected through the new tracing operation is corrected to the last change text in the change candidate group specified in the previous tracing operation, i.e., the original text before the replacement in the previous tracing operation (S115). Then, the information processing apparatus 10 performs an operation of S131 to be described below.

Conversely, when the operation direction of the new tracing operation is the text forward direction (No in S114), the information processing apparatus 10 performs an operation of S125 to be described below.

When it is determined that the selection target text is different between the previous tracing operation and the new tracing operation (No in S113), the information processing apparatus 10 discards the change candidate group specified in the previous tracing operation (S116).

Figure 18:
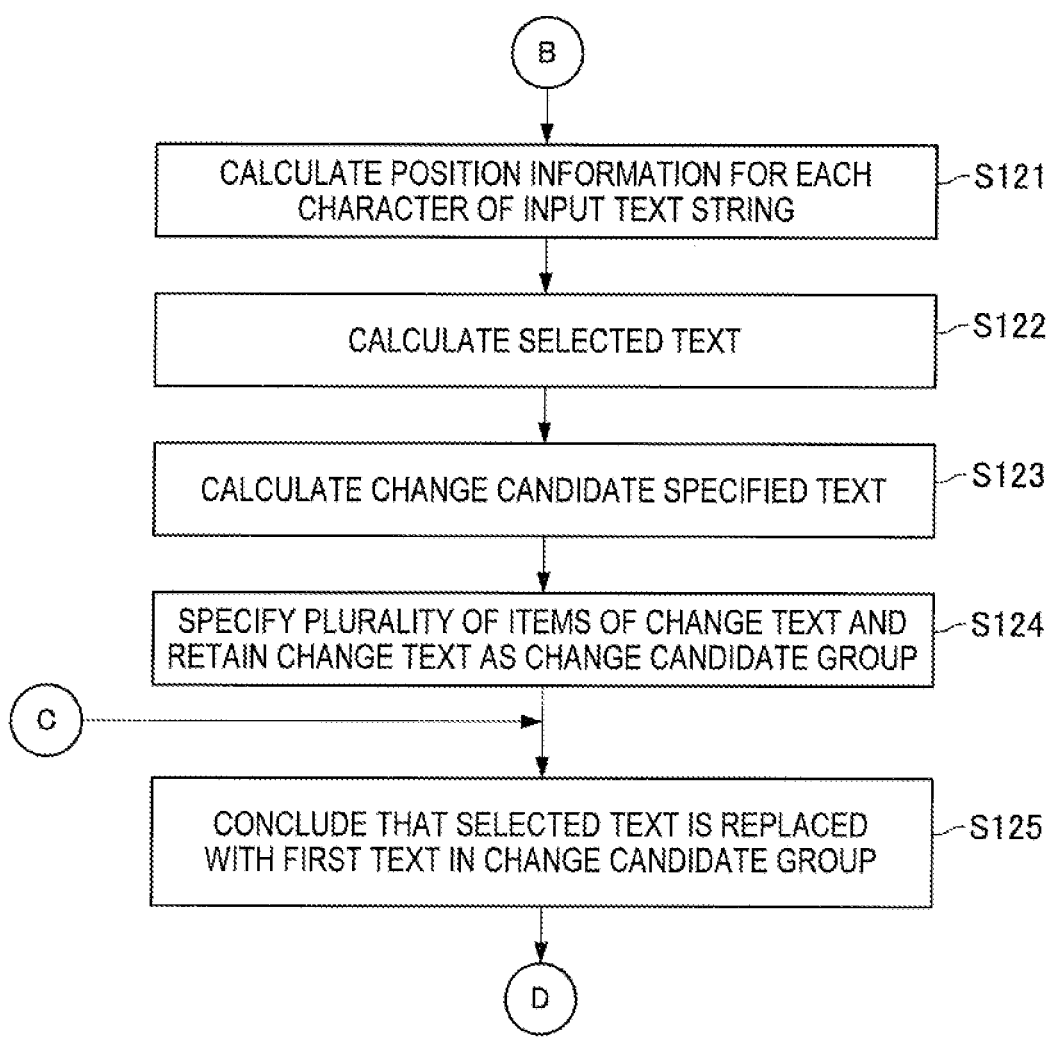
FIG. 18 is an explanatory diagram illustrating a part of the operation example according to the embodiment.

Next, an operation after S116 will be described with reference to FIG. 18. As illustrated in FIG. 18, after S116, the control unit 100 calculates position information for each character of the input text string (S121).

Subsequently, the text extraction unit 102 extracts the selected text by the new tracing operation from the input text string (S122).

Subsequently, the text specifying unit 104 extracts, as change candidate specified text, a text string immediately before the selected text from the beginning of the sentence in one sentence including the selected text (S123).

Subsequently, the text specifying unit 104 specifies a plurality of items of change text based on an evaluation value for connection to the rear of the change candidate specified text. Then, the information processing apparatus 10 retains the plurality of items of specified change text as a change candidate group in, for example, the RAM 154 (S124).

Subsequently, the selection conclusion unit 106 concludes that the selected text is replaced with the first change text in the change candidate group, i.e., the change text with the highest evaluation value for connection to the rear of the change candidate specified text (S125).

Figure 19:
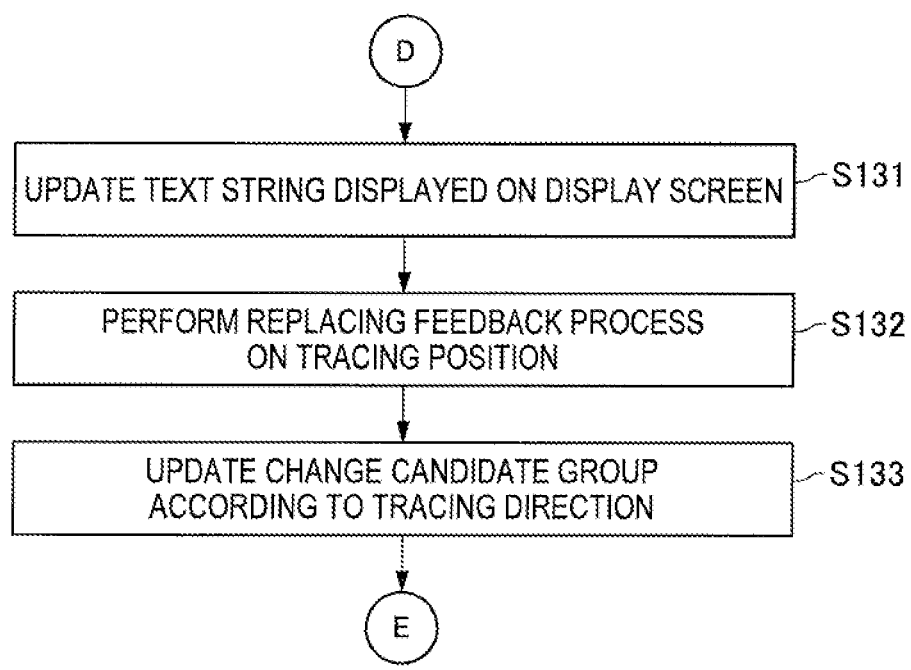
FIG. 19 is an explanatory diagram illustrating a part of the operation example according to the embodiment.

Next, an operation after S125 will be described with reference to FIG. 19. As illustrated in FIG. 19, the output control unit 112 replaces the selected text with the change text concluded by the selection conclusion unit 106 and displays the change text on the display screen 30 (S131).

Subsequently, the output control unit 112 performs a replacing feedback process (S132). For example, the output control unit 112 displays the replaced change text on the display screen 30 in an emphatic manner or outputs an audio of the replaced change text.

Subsequently, the information processing apparatus 10 updates the change candidate group according to an operation direction of a new tracing operation (S133). For example, when the operation direction of the new tracing operation is the text forward direction, the information processing apparatus 10 updates the change candidate group so that the order of each item of change text included in the change candidate group is raised by one. Also, when the operation direction of the new tracing operation is the text backward direction, the information processing apparatus 10 updates the change candidate group so that the order of each item of change text included in the change candidate group is lowered by one.

Thereafter, the information processing apparatus 10 performs the operation of S103 again.

(1-3-2. Tracing Operation Determination Process)

Figure 20:
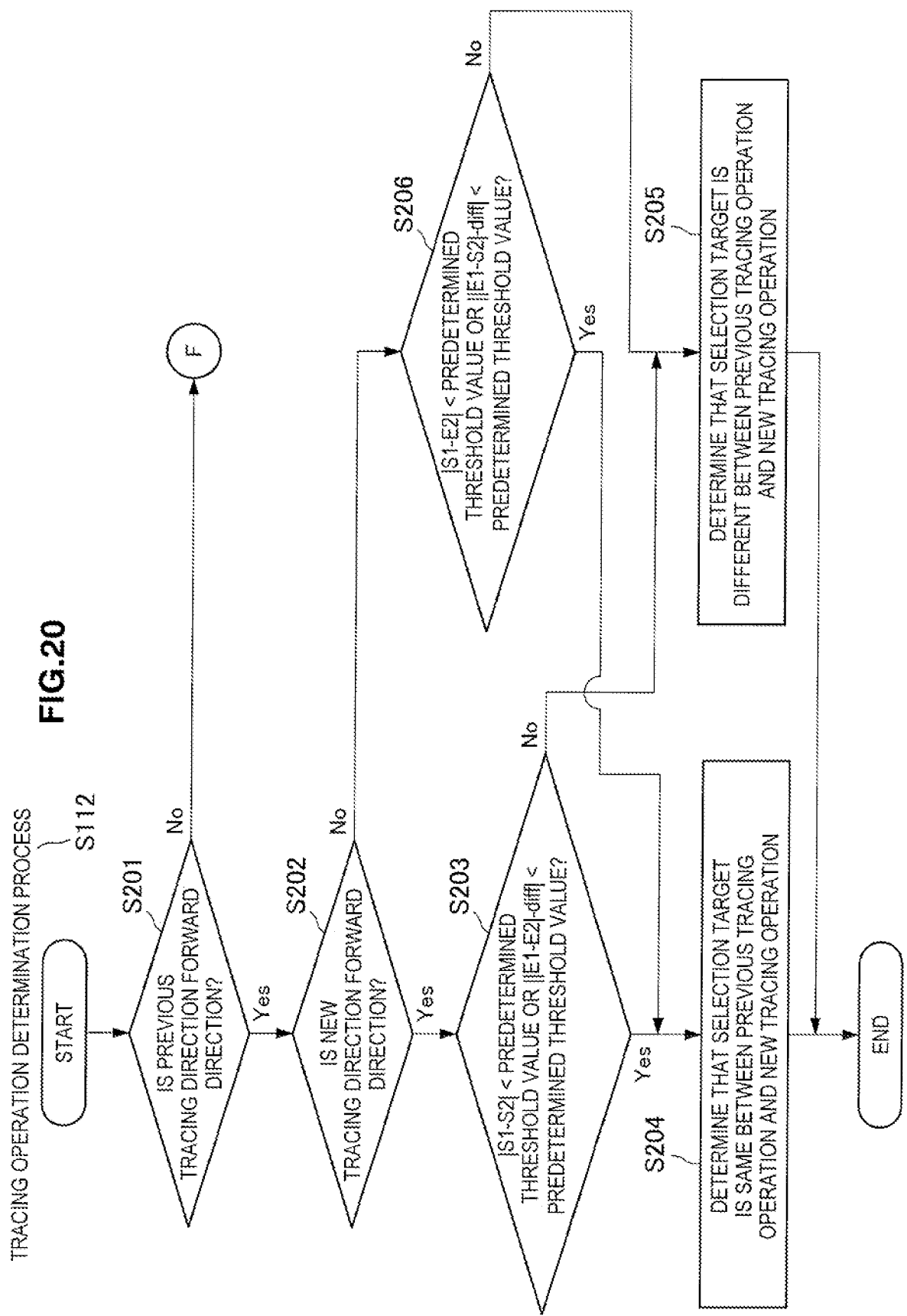
FIG. 20 is an explanatory diagram illustrating a part of an operation example of a tracing operation determination process according to the embodiment.
Figure 21:
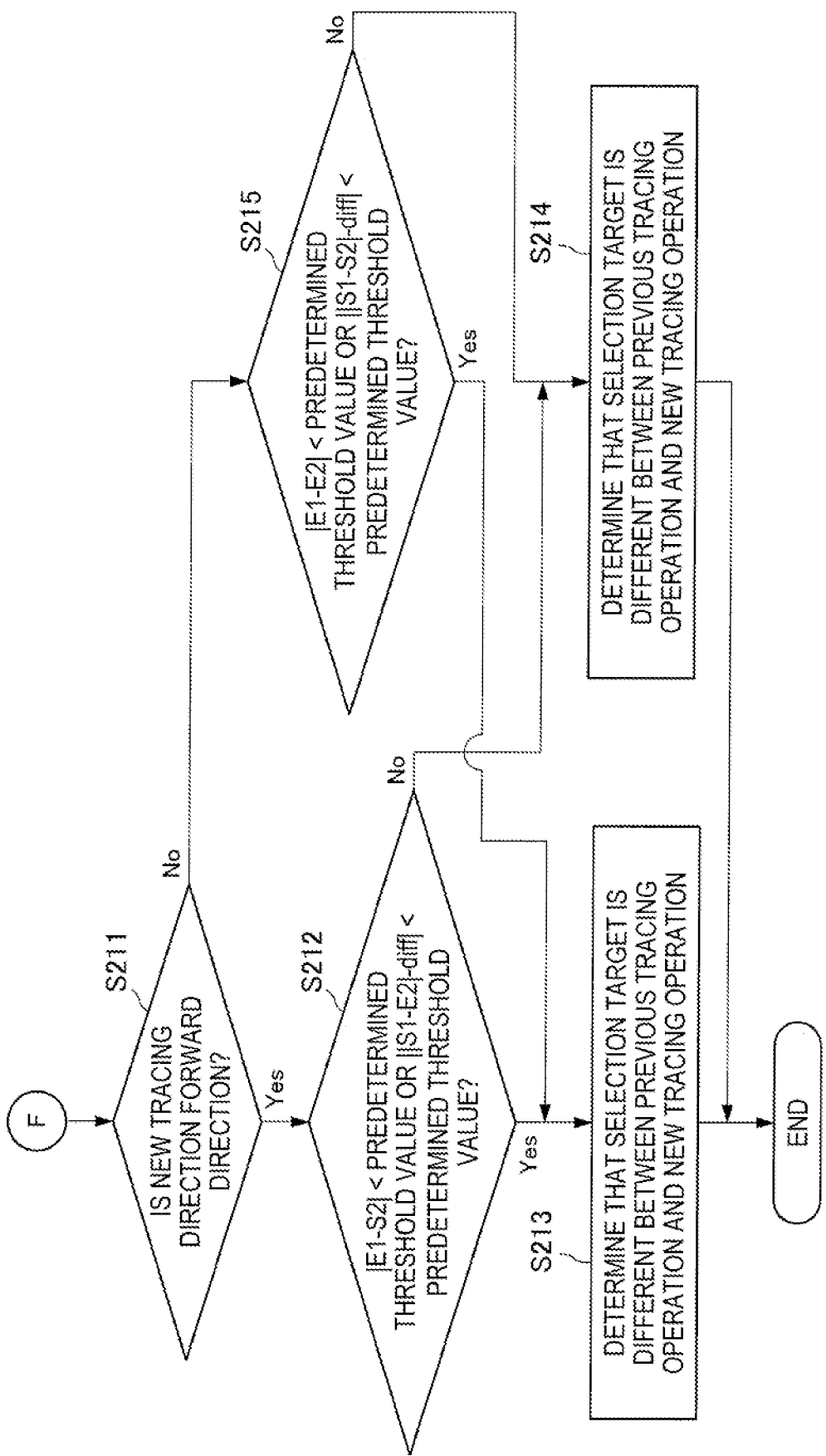
FIG. 21 is an explanatory diagram illustrating part of the operation example of the tracing operation determination process according to the embodiment.

Next, an operation of a "tracing operation determination process" of S112 will be described in detail with reference to FIGS. 20 and 21. As illustrated in FIG. 20, the touch operation determination unit 108 first confirms whether the operation direction of the previous tracing operation is the text forward direction (S201). When the operation direction of the previous tracing operation is the text backward direction (No in S201), the touch operation determination unit 108 performs an operation of S211 to be described below.

Conversely, when the operation direction of the previous tracing operation is the text forward direction (Yes in S201), the touch operation determination unit 108 confirms whether the operation direction of a new tracing operation is the text forward direction (S202). When the operation direction of the new tracing operation is the text forward direction (Yes in S202), the touch operation determination unit 108 determines whether the absolute value of the difference between the start position S1 of the previous tracing operation and the start position S2 of the new tracing operation, i.e., the value of |S1−S2|, is less than the predetermined threshold value. Also, the touch operation determination unit 108 determines whether the absolute value of the difference between and the above-described distance diff and the absolute value of the difference between the end position E1 of the previous tracing operation and the end position E2 of the new tracing operation, i.e., the value of ||E1−E2|−diff|, is less than the predetermined threshold value (S203).

When the touch operation determination unit 108 determines that the value of |S1−S2| is less than the predetermined threshold value or the value of ||E1−E2|−diff| is less than the predetermined threshold value (Yes in S203), the touch operation determination unit 108 determines that the selection target text is the same between the previous tracing operation and the new tracing operation (S204). Conversely, when the touch operation determination unit 108 determines that the value of |S1−S2| is equal to or greater than the predetermined threshold value and the value of ||E1−E2|−diff| is equal to or greater than the predetermined threshold value (No in S203), the touch operation determination unit 108 determines that the selection target text is different between the previous tracing operation and the new tracing operation (S205).

When the operation direction of the new tracing operation is the text backward direction (No in S202), the touch operation determination unit 108 determines whether the absolute value of the difference between the start position S1 of the previous tracing operation and the end position E2 of the new tracing operation, i.e., the value of |S1−E2| is less than the predetermined threshold value. Also, the touch operation determination unit 108 determines whether the absolute value of the difference between the above-described distance diff and the absolute value of the difference between the end position E1 of the previous tracing operation and the start position S2 of the new tracing operation, i.e., the value of ||E1−S2|−diff|, is less than the predetermined threshold value (S206).

When the touch operation determination unit 108 determines that the value of |S1−E2| is less than the predetermined threshold value or the value of ||E1−E2|−diff| is less than the predetermined threshold value (Yes in S206), the touch operation determination unit 108 performs the operation of S204 described above. Conversely, when the value of |S1−E2| is equal to or greater than the predetermined threshold value and the value of ||E1−S2|−diff| is equal to or greater than the predetermined threshold value (No in S206), the touch operation determination unit 108 performs the operation of S205 described above.

Next, an operation after S211 will be described with reference to FIG. 21. As illustrated in FIG. 21, in S211, the touch operation determination unit 108 confirms whether the operation direction of the new tracing operation is the text forward direction. When the operation direction of the new tracing operation is the text forward direction (Yes in S211), the touch operation determination unit 108 determines whether the absolute value of the difference between the end position E1 of the previous tracing operation and the start position S2 of the new tracing operation, i.e., the value of |E1−S2|, is less than the predetermined threshold value. Also, the touch operation determination unit 108 determines whether the absolute value of the difference between the above-described distance diff and the absolute value of the difference between the start position S1 of the previous tracing operation and the end position E2 of the new tracing operation, i.e., the value of ||S1−E2|−diff|, is less than the predetermined threshold value (S212).

When the touch operation determination unit 108 determines that the value of |E1−S2| is less than the predetermined threshold value or the value of ||S1−E2|−diff| is less than the predetermined threshold value (Yes in S212), the touch operation determination unit 108 determines that the selection target text is the same between the previous tracing operation and the new tracing operation (S213). Conversely, when the touch operation determination unit 108 determines that the value of |E1−S2| is equal to or greater than the predetermined threshold value and the value of ||S1−E2|−diff| is equal to or greater than the predetermined threshold value (No in S212), the touch operation determination unit 108 determines that the selection target text is different between the previous tracing operation and the new tracing operation (S214).

When the operation direction of the new tracing operation is the text backward direction (No in S211), the touch operation determination unit 108 determines whether the absolute value of the difference between the end position E1 of the previous tracing operation and the end position E2 of the new tracing operation, i.e., the value of |E1−E2|, is less than the predetermined threshold value. Also, the touch operation determination unit 108 determines whether the absolute value of the difference between the above-described distance diff and the absolute value of the difference between the start position S1 of the previous tracing operation and the start position S2 of the new tracing operation, i.e., the value of ||S1−S2|−diff|, is less than the predetermined threshold value (S215).

When the touch operation determination unit 108 determines that the value of |E1−E2| is less than the predetermined threshold value or the value of ||S1−S2|−diff| is less than the predetermined threshold value (Yes in S215), the touch operation determination unit 108 performs the operation of S213 described above. Conversely, when the touch operation determination unit 108 determines that the value of |E1−E2| is equal to or greater than the predetermined threshold value and the value of ||S1−S2|−diff| is equal to or greater than the predetermined threshold value (No in S215), the touch operation determination unit 108 performs the operation of S214 described above.

[1-4. Advantages]

For example, as described above with reference to FIGS. 6, 16 to 19, and the like, the information processing apparatus 10 according to the embodiment of the present disclosure extracts text selected through a touch operation of the user from an input text string displayed on the display screen 30, specifies change text of the selected text, and determines that the selected text on the display screen 30 is replaced with the change text. Therefore, when the user merely selects correction target text through the touch operation on the display screen 30, the user can correct the position of the correction target text and the text through one action. Thus, user convenience is improved.

For example, it is not necessary to perform an operation of deleting correction target text from an input text string once, and then re-inputting text. Also, since a plurality of items of correction candidate text are not displayed on the display screen 30, it is not necessary for the user to search for desired text on the display screen 30. Further, since the user can correct the input text string, for example, merely by tracing the display screen 30, a correction speed can be improved.

Also, the information processing apparatus 10 determines that the selected text is replaced with one of the plurality of items of change text based on the evaluation value for connection of the change candidate specified text to each item of change text. Therefore, the user can correct the text selected through the tracing operation to change text that is natural in the input text string in the context.

Further, when a predictive transform technology is combined at the time of the calculation of the foregoing evaluation value, the information processing apparatus 10 can specify, for example, the change candidate group which is highly likely to be selected by more users. Therefore, since the user can correct the selected text to the desired text through fewer tracing operations, the correction speed can be improved.

2. Modification Examples

Also, although preferred embodiments of the present disclosure have been described in detail with reference to the appended drawings, embodiments of the present disclosure are not limited to the above embodiments. It should be understood by those skilled in the art that various modifications, modification examples and correction examples may be made within the scope of the technical spirit and essence described in the appended claims and are, of course, construed to pertain to the technical scope of the present disclosure.

For example, the information processing apparatus 10 may display an editing mode conversion button in one region of the display screen 30, e.g., at the lower end of the display screen 30. In addition, when the editing mode conversion button is selected by a user, the information processing apparatus 10 may alternately switch between a text correction mode and a normal text editing mode in which text can be edited using, for example, a keyboard or a software keyboard, through the above-described touch operation. In this modification example, for example, when the user desires to considerably correct an input text string, e.g., adds one sentence or deletes one sentence, the user can select the normal text editing mode. Therefore, the convenience can be further improved.

Also, in the foregoing description, the application example has been described when the input text string is displayed in a horizontal writing mode, but embodiments of the present disclosure are not limited to this example. For example, when an input text string is displayed in a vertical writing mode in Japanese, Chinese, or the like, the information processing apparatus 10 can realize the same function by changing the horizontal direction to the vertical direction on the display screen 30.

In the foregoing description, the example in which the user directly inputs a text string to the information processing apparatus 10, for example, by a software keyboard, a sound of the user or the like has been described, but embodiments of the present disclosure are not limited to this example. For example, the information processing apparatus 10 can be likewise applied also to a situation in which text data or the like input by another person is acquired and text is edited based on the acquired text data.

The description has been given of the example where the information processing apparatus 10 includes components included in the control unit 100 such as the text extraction unit 102 and the text specifying unit 104 according to the embodiment of the present disclosure, but the embodiment of the present disclosure is not limited to the example. Instead of being provided to the information processing apparatus 10, the components included in the control unit 100 described above may be provided to a communication device capable of communicating with the information processing apparatus 10, such as a server device. Moreover, instead of being stored in the information processing apparatus 10, a computer program for causing the components included in the control unit 100 described above to exert functions equivalent to those in the components may be stored in the communication device.

Additionally, the present technology may also be configured as below.

(1) An information processing apparatus including:
a text extraction unit configured to extract text selected through a touch operation of a user from an input text string displayed on a display screen;
a text specifying unit configured to specify change text of the selected text; and
a selection conclusion unit configured to conclude that the selected text on the display screen is replaced with the change text.

(2) The information processing apparatus according to (1), wherein the touch operation of the user is a tracing operation of the user tracing a part of the input text string on the display screen with a finger.

(3) The information processing apparatus according to (1) or (2),
wherein the text specifying unit specifies a plurality of items of the change text based on text located prior to the selected text, and
wherein the selection conclusion unit concludes that the selected text is replaced with one of the plurality of items of change text based on an evaluation value for connection of the text located prior to the selected text to each item of change text.

(4) The information processing apparatus according to (3), wherein the selection conclusion unit concludes that the selected text is replaced with the change text with a highest evaluation value for connection of the text located prior to the selected text to each item of change text.

(5) The information processing apparatus according to (3) or (4),
wherein, when the user performs a second touch operation after a first touch operation, the text extraction unit extracts second selected text which is text selected through the second touch operation from the input text string, and
wherein the information processing apparatus further includes a touch operation determination unit configured to determine whether selection target text is identical between the first touch operation and the second touch operation by comparing a start position or an end position of the first touch operation to a start position or an end position of the second touch operation.

(6) The information processing apparatus according to (5), wherein, when the touch operation determination unit determines that the selection target text is identical between the first touch operation and the second touch operation, the selection conclusion unit concludes that the second selected text is replaced with the change text having a second highest evaluation value after the change text determined through the first touch operation.

(7) The information processing apparatus according to (5) or (6), wherein, when the touch operation determination unit determines that the selection target text is different between the first touch operation and the second touch operation,
the text specifying unit specifies second change text which is change text of the second selected text, and
the selection conclusion unit concludes that the second selected text on the display screen is replaced with the second change text.

(8) The information processing apparatus according to any one of (5) to (7), further including:
a touch direction determination unit configured to determine whether an operation direction of the touch operation of the user is a text forward direction or a text backward direction by comparing a start position and an end position of the touch operation of the user.

(9) The information processing apparatus according to (8),
wherein, when the start position of the touch operation of the user is located prior to the end position of the touch operation of the user in the input text string, the touch direction determination unit determines that the operation direction of the touch operation of the user is the text forward direction, and
wherein, when the start position of the touch operation of the user is located posterior to the end position of the touch operation of the user in the input text string, the touch direction determination unit determines that the operation direction of the touch operation of the user is the text backward direction.

(10) The information processing apparatus according to (8) or (9), wherein, when the touch direction determination unit determines that the operation direction is identical between the first touch operation and the second touch operation and a value according to a difference between the start position of the first touch operation and the start position of the second touch operation is less than a predetermined threshold value, the touch operation determination unit determines that the selection target text is identical between the first touch operation and the second touch operation.

(11) The information processing apparatus according to any one of (8) to (10), wherein, when the touch direction determination unit determines that the operation direction is identical between the first touch operation and the second touch operation and a value according to a difference between the end position of the first touch operation and the end position of the second touch operation is less than a predetermined threshold value, the touch operation determination unit determines that the selection target text is identical between the first touch operation and the second touch operation.

(12) The information processing apparatus according to any one of (8) to (11), wherein, when the touch direction determination unit determines that the operation direction is opposite between the first touch operation and the second touch operation and a value according to a difference between the start position of the first touch operation and the end position of the second touch operation is less than a predetermined threshold value, the touch operation determination unit determines that the selection target text is identical between the first touch operation and the second touch operation.

(13) The information processing apparatus according to any one of (8) to (12), wherein, when the touch direction determination unit determines that the operation direction is opposite between the first touch operation and the second touch operation and a value according to a difference between the end position of the first touch operation and the start position of the second touch operation is less than a predetermined threshold value, the touch operation determination unit determines that the selection target text is identical between the first touch operation and the second touch operation.

(14) The information processing apparatus according to any one of (8) to (13), wherein, when the touch operation determination unit determines that the selection target text is identical between the first touch operation and the second touch operation and the touch direction determination unit determines that the operation direction of the second touch operation is the text backward direction, the selection conclusion unit concludes that the second selected text is replaced with original text before replacement in the first touch operation.

(15) The information processing apparatus according to any one of (1) to (14), wherein the text is a word.

(16) The information processing apparatus according to any one of (1) to (15), further including:
an output control unit configured to replace the selected text with the change text concluded by the selection conclusion unit and display the change text on the display screen.

(17) An information processing method including:
extracting text selected through a touch operation of a user from an input text string displayed on a display screen;
specifying change text of the selected text; and
concluding that the selected text on the display screen is replaced with the change text.

(18) A program causing a computer to function as:
a text extraction unit configured to extract text selected through a touch operation of a user from an input text string displayed on a display screen;
a text specifying unit configured to specify change text of the selected text; and
a selection conclusion unit configured to conclude that the selected text on the display screen is replaced with the change text.

What is claimed is:

1. An information processing apparatus comprising:
a central processing unit that:
extracts text selected through a touch operation of a user from an input text string displayed on a display screen;
determines whether an operation direction of the touch operation of the user is a text forward direction or a text backward direction;
specifies change text of the selected text from a plurality of items of change text in a change candidate group; and
concludes that the selected text on the display screen is replaced with the change text,
wherein, when the user performs a second touch operation after a first touch operation, the central processing unit is configured to extract second selected text which is text selected through the second touch operation from the input text string, and
wherein, when selection target text is determined to be identical between the first touch operation and the second touch operation and the central processing unit determines that the operation direction of the second touch operation is the text backward direction, the second selected text is replaced with original text before replacement in the first touch operation and the change candidate group is updated to obtain an updated change candidate group including the plurality of items of change text such that each item of the plurality of items of change text in the updated change candidate group is lowered in relation to an order of each item of the plurality items of change text in the change candidate group, and when the central processing unit determines that the operation direction of the second touch operation is the text forward direction, the change candidate group is updated to obtain an updated change candidate group including the plurality of items of change text such that each item of the plurality of items of change text in the updated change candidate group is raised in relation to an order of each item of the plurality items of change text in the change candidate group.

2. The information processing apparatus according to claim 1, wherein the touch operation of the user is a tracing operation of the user tracing a part of the input text string on the display screen with a finger.

3. The information processing apparatus according to claim 1,
wherein the central processing unit specifies the plurality of items of change text based on text located prior to the selected text, and
concludes that the selected text is replaced with one of the plurality of items of change text based on an evaluation value for connection of the text located prior to the selected text to each item of change text.

4. The information processing apparatus according to claim 3, wherein the central processing unit concludes that the selected text is replaced with the change text with a highest evaluation value for connection of the text located prior to the selected text to each item of change text.

5. The information processing apparatus according to claim 3,
wherein the central processing unit determines whether the selection target text is identical between the first touch operation and the second touch operation by comparing a start position or an end position of the first touch operation to a start position or an end position of the second touch operation.

6. The information processing apparatus according to claim 5, wherein, when the central processing unit determines that the selection target text is different between the first touch operation and the second touch operation, specifies second change text which is change text of the second selected text, and concludes that the second selected text on the display screen is replaced with the second change text.

7. The information processing apparatus according to claim 5, wherein, when the central processing unit determines that the operation direction is identical between the first touch operation and the second touch operation and a value according to a difference between the start position of the first touch operation and the start position of the second touch operation is less than a predetermined threshold value, the touch operation determination unit determines that the selection target text is identical between the first touch operation and the second touch operation.

8. The information processing apparatus according to claim 5, wherein, when the central processing unit determines that the operation direction is identical between the first touch operation and the second touch operation and a value according to a difference between the end position of the first touch operation and the end position of the second touch operation is less than a predetermined threshold value, the central processing unit determines that the selection target text is identical between the first touch operation and the second touch operation.

9. The information processing apparatus according to claim 5, wherein, when the central processing unit determines that the operation direction is opposite between the first touch operation and the second touch operation and a value according to a difference between the start position of the first touch operation and the end position of the second touch operation is less than a predetermined threshold value, the central processing unit determines that the selection target text is identical between the first touch operation and the second touch operation.

10. The information processing apparatus according to claim 5, wherein, when the central processing unit determines that the operation direction is opposite between the first touch operation and the second touch operation and a value according to a difference between the end position of the first touch operation and the start position of the second touch operation is less than a predetermined threshold value, the central processing unit determines that the selection target text is identical between the first touch operation and the second touch operation.

11. The information processing apparatus according to claim 1, wherein, when the start position of the touch operation of the user is located prior to the end position of the touch operation of the user in the input text string, the central processing unit determines that the operation direction of the touch operation of the user is the text forward direction, and wherein, when the start position of the touch operation of the user is located posterior to the end position of the touch operation of the user in the input text string, the central processing unit determines that the operation direction of the touch operation of the user is the text backward direction.

12. The information processing apparatus according to claim 1, wherein the text is a word.

13. The information processing apparatus according to claim 1, further comprising:

a display screen.

14. The information processing apparatus of claim 1, in which the original text is included in each of the changed candidate group and the updated change candidate group.

15. The information processing apparatus of claim 1, in which the order of the each item of the plurality of items of change text in the updated change candidate group is lowered by one in relation to the order of each item of the plurality items of change text in the change candidate group.

16. An information processing method comprising:

extracting text selected through a touch operation of a user from an input text string displayed on a display screen;

determining whether an operation direction of the touch operation of the user is a text forward direction or a text backward direction;

specifying change text of the selected text from a plurality of items of change text in a change candidate group; and concluding that the selected text on the display screen is replaced with the change text, wherein, when the user performs a second touch operation after a first touch operation, extracting second selected text which is text selected through the second touch operation from the input text string, and wherein, when selection target text is determined to be identical between the first touch operation and the second touch operation and the operation direction of the second touch operation is determined to be the text backward direction, concluding that the second selected text is replaced with original text before replacement in the first touch operation and updating the change candidate group to obtain an updated change candidate group including the plurality of items of change text, in which an order of each item of the plurality of items of change text in the updated change candidate group is lowered in relation to an order of each item of the plurality items of change text in the change candidate group, and when the touch direction determination unit determines that the operation direction of the second touch operation is the text forward direction, updating the change candidate group to obtain an updated change candidate group including the plurality of items of change text such that each item of the plurality of items of change text in the updated change candidate group is raised in relation to an order of each item of the plurality items of change text in the change candidate group.

17. A non-transitory computer readable storage device having stored thereon a program which upon execution causes a computer to:

extract text selected through a touch operation of a user from an input text string displayed on a display screen;

determine whether an operation direction of the touch operation of the user is a text forward direction or a text backward direction;

specify change text of the selected text from a plurality of items of change text in a change candidate group; and conclude that the selected text on the display screen is replaced with the change text, wherein, when the user performs a second touch operation after a first touch operation, the text extraction unit is configured to extract second selected text which is text selected through the second touch operation from the input text string, and wherein, when selection target text is determined to be identical between the first touch operation and the second touch operation and the operation direction of the second touch operation is the text backward direction, the second selected text is replaced with original text before replacement in the first touch operation and the change candidate group is updated to obtain an updated change candidate group including the plurality of items of change text such that each item of the plurality of items of change text in the updated change candidate group is lowered in relation to an order of each item of the plurality items of change text in the change candidate group, and when the operation direction of the second touch operation is determined to be the text forward direction, the change candidate group is updated to obtain an updated change candidate group including the plurality of items of change text such that each item of the plurality of items of change text in the updated change candidate group is raised in relation to an order of each item of the plurality items of change text in the change candidate group.

* * * * *